(12) United States Patent
Pabla et al.

(10) Patent No.: US 6,317,144 B1
(45) Date of Patent: Nov. 13, 2001

(54) METHOD AND APPARATUS FOR NAVIGATING DISPLAYED ELEMENTS

(75) Inventors: Kuldipsingh Pabla, Santa Clara; Yu-Tung Kan, Sunnyvale; Eric Bergman, Palo Alto; Venkatesh Narayanan, Fremont, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/201,436

(22) Filed: Nov. 30, 1998

(51) Int. Cl.[7] ........................................ G06F 3/00
(52) U.S. Cl. ............................... 345/854; 345/784
(58) Field of Search .................... 345/334, 335, 345/340, 341, 353, 355, 356, 357, 765, 744, 781, 784, 841, 848, 853, 854

(56) References Cited

U.S. PATENT DOCUMENTS

| 5,555,354 | * | 9/1996 | Strasnick et al. ............... 345/355 |
| 5,745,710 | * | 4/1998 | Clanton, III et al. ............ 345/327 |
| 5,886,697 | * | 3/1999 | Naughton et al. ............... 345/348 |
| 5,977,972 | * | 11/1999 | Bates et al. ..................... 345/341 |

* cited by examiner

*Primary Examiner*—Cao H. Nguyen
(74) *Attorney, Agent, or Firm*—The Becker Law Group

(57) ABSTRACT

The invention is a method and apparatus for navigating displayed screen elements. In accordance an embodiment of the invention, the method comprises the steps of generating a reference anchor, accepting a navigation input from a user, and determining a next displayed element to be selected based on the user-entered navigation input and the positions of the displayed elements to the reference anchor.

36 Claims, 11 Drawing Sheets

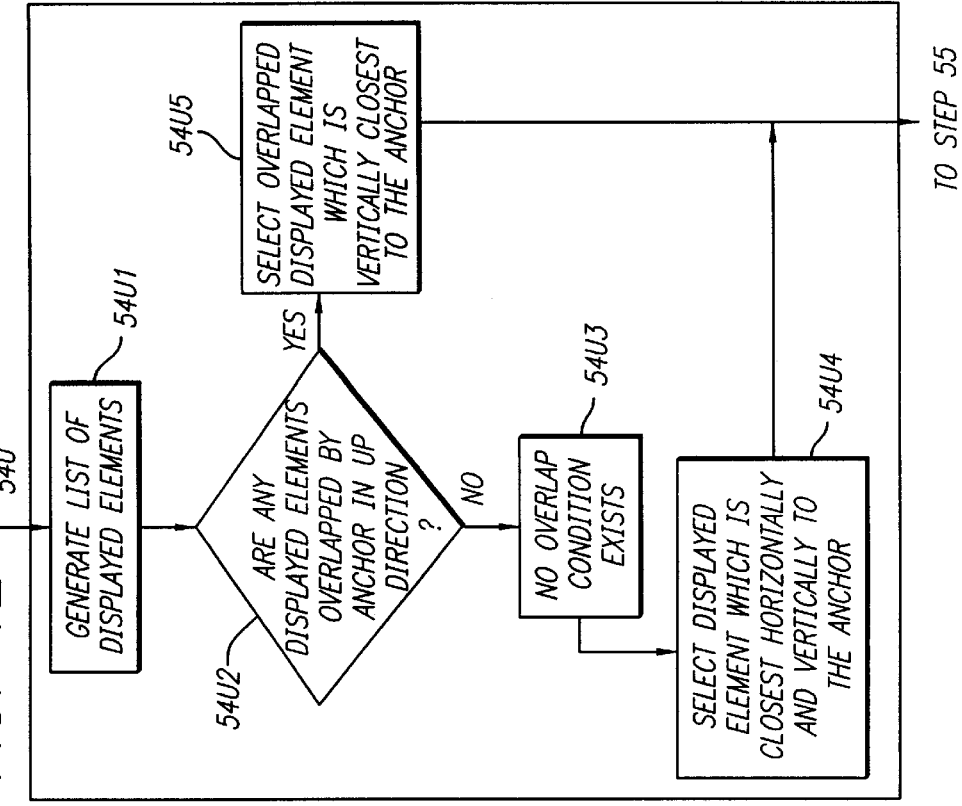

METHOD AND APPARATUS FOR NAVIGATING DISPLAYED ELEMENTS

BACKGROUND OF THE INVENTION

1. Field of the Invention

This invention relates to a method and apparatus for navigating displayed elements, such as screen elements associated with a graphical user interface.

2. Background Art

Many devices are arranged to present or display one or more elements to a user. For example, one or more icons or windows of a graphical user interface may be displayed on a video display of a computer.

It is often necessary for the user of the device to select among these "displayed elements." For example, where multiple icons are displayed on a video display associated with a computer, a user may be required to select a particular icon to initiate an application.

Some devices include a pointing apparatus, sensor or other input arrangement which permits the user to indicate precisely a displayed element on the video screen, regardless of the positions of or order of the displayed elements. Such an apparatus commonly comprises a mouse which the user manipulates by hand to move a displayed curser or arrow. The user moves the mouse to direct the displayed arrow into a position in which it is displayed over or in contact with the displayed element. This alone or in combination with another action, such as clicking a mouse button or pressing a keyboard key, may effectuate selection of a particular displayed element. The selection of a displayed element may be visually confirmed for the user's benefit, such as by changing the color of the displayed element, highlighting it or the like. The display may also comprise a touch sensitive screen by which the user selects a displayed element simply by pointing to it.

Some devices do not have an input arrangement as described above. For example, a computer may not include a mouse. It may also be desirable to navigate among displayed elements in an alternate fashion even when the device includes such an input arrangement. As an example, a user may wish to utilize a keyboard to navigate displayed elements on a video display instead of using an attached mouse.

Devices which utilize a television as an associated display often do not have such an input arrangement either. For example, video tape players and world wide web (WWW) television display devices commonly do not include a pointing device such as a mouse or any other input arrangement which permits a user to directly "pick" a menu item, icon or the like.

In these situations, the user is provided with some other input device with which the user must navigate the displayed elements. This input device may comprise the "arrow" keys of a keyboard or remote control. A problem with these types of input devices is that they do not provide a user complete control over the selection process. Instead, a user enters a discrete control input, such as by pressing a left arrow button, and the device must determine what displayed element should be selected in response to that input. Unlike the pointing input arrangements described above, in this type of navigation arrangement multiple user-inputs may be required to navigate to a particular displayed element, with the ability of the user to select a particular displayed element dependent upon the user's navigating a path through other displayed elements.

The navigation or traversal of displayed elements in response to various keystrokes is often not predictable. Thus, for a user to select a particular displayed element, the user may need to input a keystroke, assess the result of the input, then input another keystroke and the like until the desired display element is ultimately selected. This process can be time consuming and frustration for a user. In some instances, numerous keystrokes by a user may never even result in the selection of the desired display element.

A need exists for an improved navigation system for displayed elements.

SUMMARY OF THE INVENTION

The invention is a method and apparatus for navigating displayed elements such as screen elements associated with a graphical user interface.

In accordance with one embodiment of the invention, the method comprises the steps of generating a reference anchor, accepting a user-entered navigation input, and determining a displayed element for selection dependent upon the positions of the displayed elements in relation to the anchor and the user-entered navigation input.

In accordance with one embodiment of the method, the anchor is adjusted after a new displayed element is selected.

In one or more embodiments, computer hardware and/or software is arranged to perform the method of the invention.

Further objects, features and advantages of the invention will become apparent from the detailed description of the drawings which follows, when considered with the attached figures.

BRIEF DESCRIPTION OF THE DRAWINGS

FIG. 12 is a flowchart illustrating in detail that portion of the method illustrated in FIG. 6 wherein the user input is an up navigation input;

FIG. 14 is a flowchart illustrating in detail that portion of the method illustrated in FIG. 6 where the user input is a down navigation input;

DETAILED DESCRIPTION OF THE INVENTION

Figure 1:
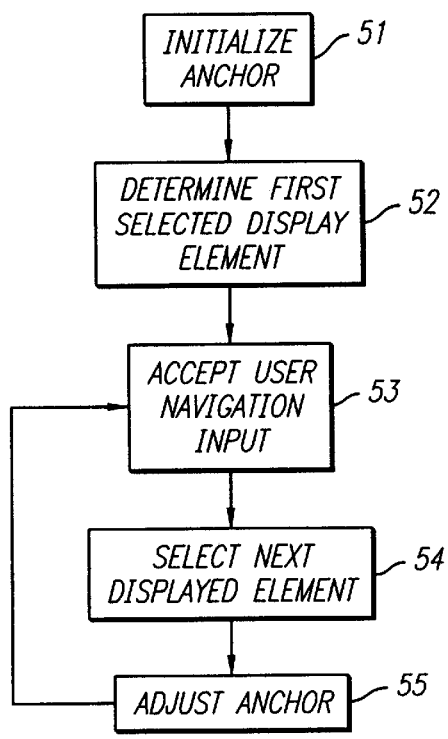
FIG. 1 is a flowchart illustrating a method of the invention.

The invention is a method and apparatus for navigating displayed elements, such as screen elements associated with a graphical user interface (GUI). In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Portions of the disclosure of this patent document may contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Java and all Java-based trademarks and logos are trademarks or registered trademarks of Sun Microsystems, Inc. in the United States and other countries. All SPARC trademarks are used under license and are trademarks or registered trademarks of SPARC International in the United States and other countries. Products bearing SPARC trademarks are based upon an architecture developed by Sun Microsystems, Inc.

Method for Navigating Displayed Elements

One or more embodiments of the invention comprise a method for navigating or traversing screen elements. As used herein, "displayed element" means an item which is associated with a video screen or other display for presentation to or use by a user. For example, a displayed element may comprise a screen element such as an icon, window or button which is displayed on a video display of a computer. A displayed element may also comprise a holographic form, image, body or other item displayed or presented, regardless of location, such as on a screen or in free-space.

The term "selected" when referring to or used in association or conjunction with "displayed element" means an identification of a particular displayed element. In one or more embodiments, that a particular displayed element has been selected may be indicated to a user. For example, a particular displayed element may be indicated as selected to a user on a video display by changing the color of or highlighting that displayed element as compared to its non-selected condition.

In one or more embodiments, navigation of the displayed elements is dependent upon directional input information from a user. This input information may be received in a variety of forms, such as voice, keystroke, hand movement or the like. By directional input information, it is meant an indication of intended movement among the displayed elements.

In one embodiment, the navigation method is associated with a computer having a video screen, such as described in detail below and illustrated in FIG. 17. As illustrated therein, the computer 100 includes a keyboard 110 having one or more keys through which the user provides navigation or direction input information to the computer.

Referring to FIG. 1, in a first step S1 a pseudo or reference anchor (generally referred to herein simply as "anchor") is generated or set. The anchor is a reference which is used as an aid in determining the next displayed element which should be selected based on a particular user input. In one embodiment, the anchor has dimensions and is not simply a point.

Initially, the anchor is initialized to a set of default values. As an example, the anchor may be initialized to the size of a first selected displayed element.

After initialization of the anchor, in a step S2 a determination is made as to which displayed element should be selected. For example, if a user is not currently navigating displayed elements and then wishes to navigate the screen elements, the user may press the "escape" or other key of a keyboard. In accordance with the method of the invention, one of the displayed elements is then selected as a starting point for navigation of the other displayed elements. As stated above, the first displayed element which is selected may simply comprise the first displayed element of a list of all displayed elements.

In one or more embodiments, the displayed elements are listed or ordered in accordance with the position of their top left corner. In such an arrangement, the first displayed element of the list may comprise that displayed element having a top left corner which is closest to the top left of the screen or other display.

In a step S3, a user navigation input is accepted. This input may comprise, for example, the pressing of a left, right, up or down arrow key of a keyboard.

Based on the user input, in a step S4 a new displayed element is selected. This process is described in more detail below. In general, however, the next displayed element which is selected is dependent upon the relationship of each displayed element to the anchor and the user-entered navigation input.

Once the new displayed element is selected, in a step S5 the anchor is adjusted. The process then repeats with the input of a new navigation selection by a user in step S3.

The various aspects of this method will now be described in more detail.

The Anchor

As stated above, the anchor is a geometric reference. In the first step S1, the anchor is initialized. As stated above, the anchor may be initialized to the same geometry as the first displayed element in a list of the displayed elements. In one embodiment, the displayed elements are listed in top-down order in accordance with the position of their top left corners or coordinates.

Figure 2:
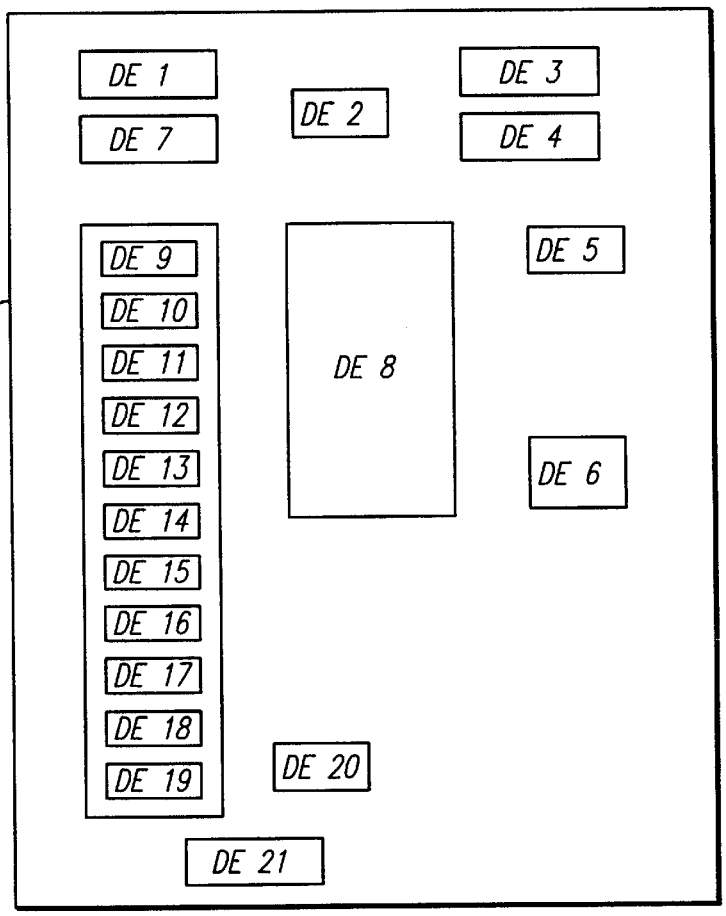
FIG. 2 illustrates a video screen displaying multiple displayed elements.

FIG. 2 illustrates a video screen 117 illustrating displayed elements DE1–DE21. Displayed elements DE9–DE 19 are all part of a common compartment. In this arrangement of displayed elements, DE1 may be the first listed displayed element by reason of its having a top left corner which is both closest to the left hand edge of the screen 117 and the top of the screen. In such event, the anchor may be initialized to the same geometry as displayed element DE1.

In accordance with this embodiment, the anchor has a perimeter defined by a top edge, a bottom edge, a right edge (or side), and a left edge (or side) (generally referred to as "top," "bottom," "right," and "left" herein). In one or more embodiments, the anchor is not displayed to the user, but simply comprises a set of reference data, such as coordinates or the like. As described below, the anchor may have a variety of differing geometries other than a parallel-piped.

Figure 3:
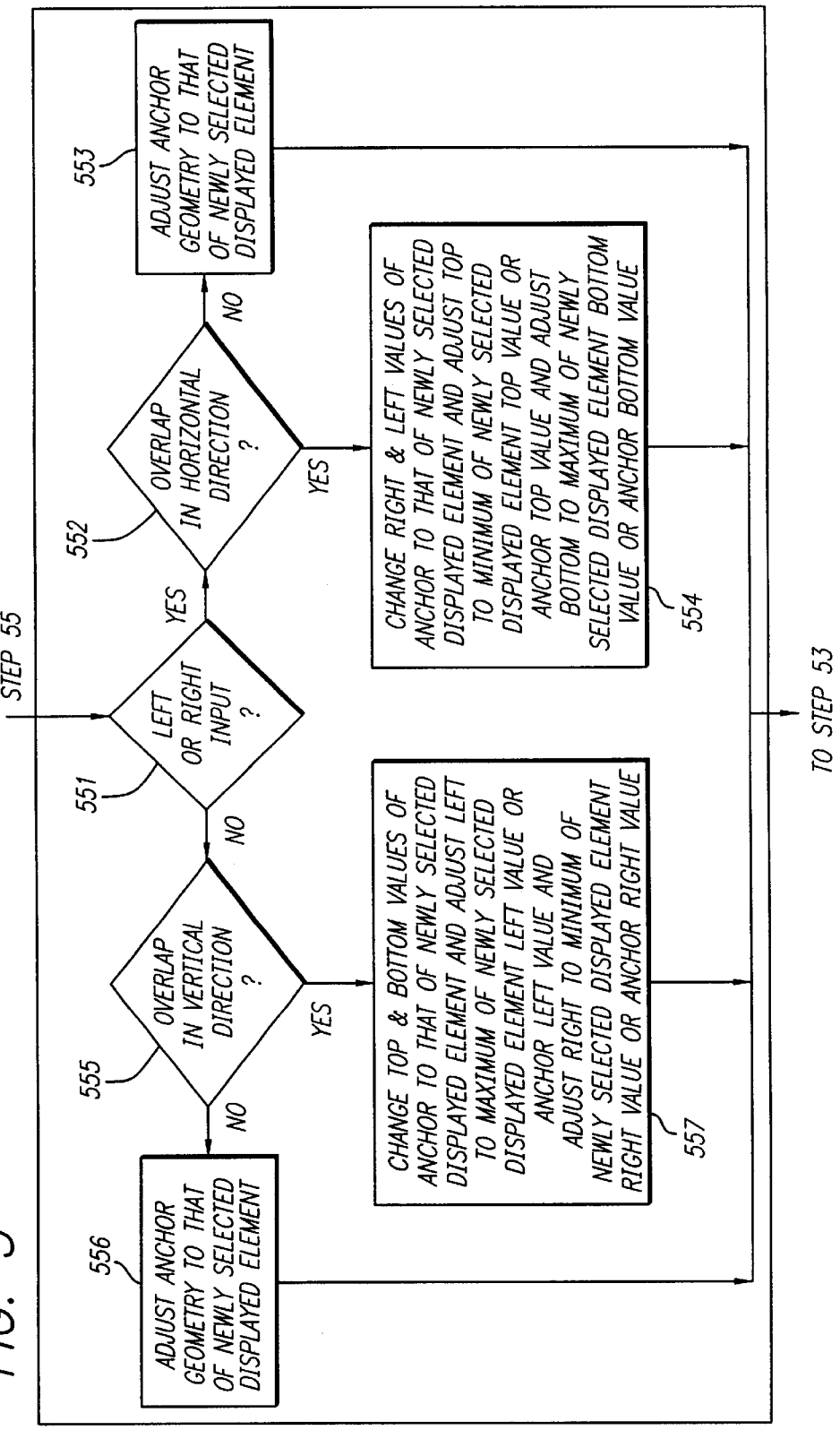
FIG. 3 is a flowchart illustrating a method for adjusting the geometry of an anchor.

When a new displayed element is determined for selection (as in step S4), the anchor is adjusted. In accordance with an embodiment of the invention, the anchor is adjusted (i.e. its geometry or other characteristics are set) in accordance with the method illustrated in FIG. 3.

First, in a step S51 it is determined if the user navigation input was a left or right input. If so, then in a step S52 it is determined if the newly selected displayed element (selected in accordance with step S4 of FIG. 1) overlaps with the current anchor. By "overlaps" it is meant a condition in which a projection of the anchor in the desired direction of movement (i.e. right or left in this case) intersects with at least some portion of the next selected displayed element.

If an overlap condition does exist, then in a step S54 the left and right values of the anchor are adjusted to be the same as that of the newly selected displayed element. In addition, the top value of the anchor is adjusted to comprise the minimum value (i.e. vertically lowest) selected from the current anchor top value and the top value of the newly selected displayed element. The bottom value of the anchor is adjusted to comprise the maximum value (i.e. vertically highest) selected from the current anchor bottom value and the bottom value of the newly selected displayed element. It should be understood that in this arrangement the size of the anchor can not increase when there is an overlap condition.

Figure 4:
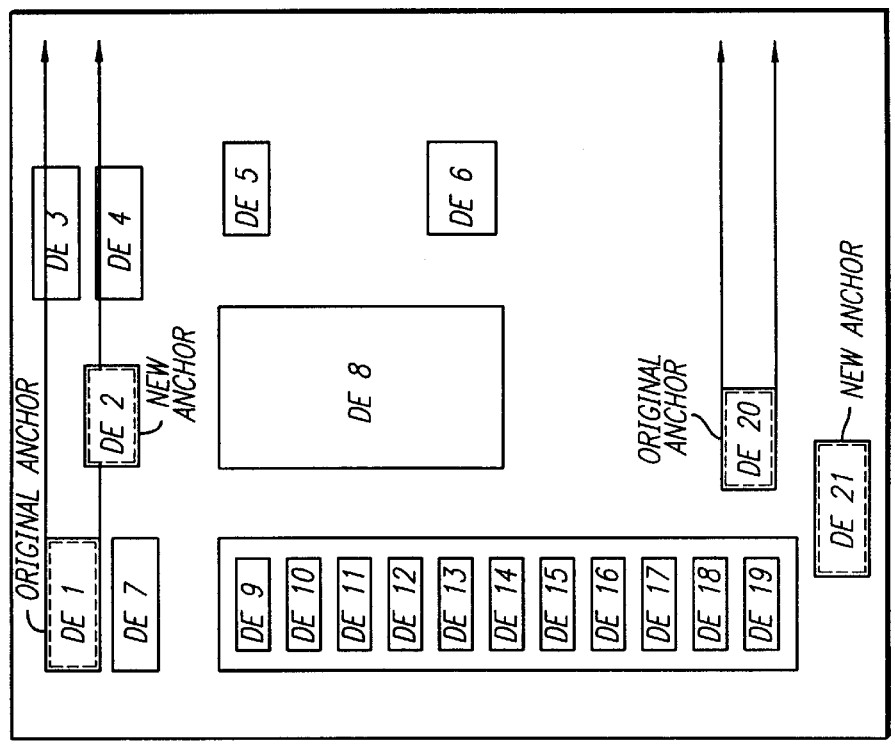
FIG. 4 illustrates examples of anchor geometry adjustment in response to a horizontal navigation user input.

For example, referring to FIG. 4, assume that the currently selected displayed element is DE1 and the anchor currently has the same geometry as DE1. Next, assume that a user entered a right navigation input resulting in the selection of DE2 (such as in accordance with the selection process described in more detail below). An overlap condition exists with newly selected displayed element DE2, since DE2 lies at least partially within the projection of the anchor in the direction of movement. The projection of the current anchor in the direction of movement is indicated in this figure by the arrows, and comprises a band having top and bottom limits the same as the top and bottom of the anchor, and extending to the right from the right side of the anchor. In accordance with step S54, the right and left values of the anchor are adjusted to comprise the right and left values of DE2. The top value of the anchor is adjusted to comprise the top value of DE2, since this value is lower than the top value of the original anchor, and the bottom value of the anchor comprises that of the original anchor, since this value is greater (i.e. higher) than the bottom value of DE2.

The newly adjusted anchor (if displayed) would then look as illustrated by the dotted lines in FIG. 4.

It may thus be understood that a determination of whether an overlap condition exists when the move is a right or left move depends on whether a displayed element falls at least partially within a projection of the anchor in the horizontal direction.

If an overlap condition does not exist, then in a step S53 the anchor is adjusted to the geometry of the newly selected displayed element. For example, referring to FIG. 4, if the last selected displayed element comprised DE20 and a right user input resulted in the selection of DE21, the new geometry of the anchor would be the same as DE21. It may thus be understood that the size of the anchor may increase when there is a no overlap condition.

If in step S51 it was determined that the user input was not a left or right input (meaning that the input was an up or down input) then in a step S55 it is determined if an overlap condition exists in the direction of movement. In this context, overlap means whether a projection of the anchor vertically up or down intersects with at least a portion of the newly selected displayed element.

If an overlap condition exists, then in a step S57 the top and bottom values of the anchor are adjusted to comprise the top and bottom values of the newly selected displayed element. The left value of the anchor is adjusted to comprise the maximum value (i.e. the right-most of the left values) of the original anchor left value or newly selected displayed element left value. The right value of the anchor is adjusted to comprise the minimum value (i.e. the left-most of the right values) of the original anchor right value or newly selected displayed element right value.

Figure 5:
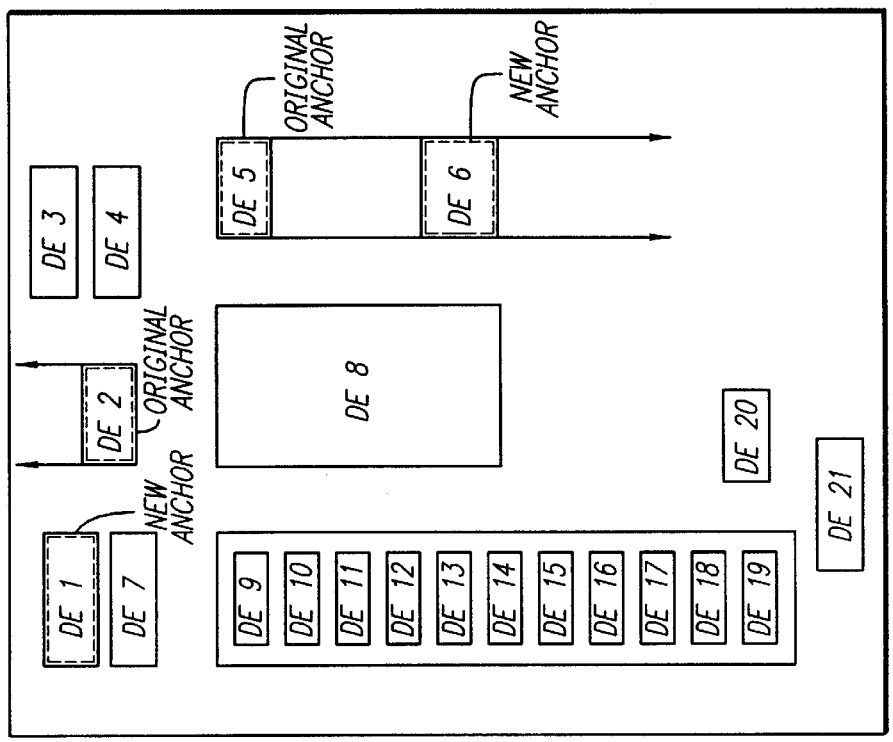
FIG. 5 illustrates graphically examples of anchor geometry adjustment in response to vertical navigation user input.

For example, referring to FIG. 5, assume that a down move resulted in navigation from displayed element DE5 to newly selected displayed element DE6. Also assume that the original anchor had the same geometry as DE5. The top and bottom values of the adjusted or new anchor will now comprise the top and bottom values of newly selected displayed element DE6. The left and right values of the anchor comprise the left and right values of DE6, since the left value of DE6 is greater than (i.e. not as far left) as the left value of the original anchor and the right value of DE6 is less than (i.e. not as far right) as the right value of the original anchor.

In the event a condition of no overlap exists, the anchor geometry is adjusted to the geometry of the newly selected displayed element, in accordance with step S56. As an example, referring to FIG. 5 again, assume that an up move resulted in the selection of DE1 when the currently selected displayed element was DE2. The projection of the old anchor does not overlap the newly selected displayed element (DE1), and as such the anchor is adjusted to have the same geometry as the newly selected displayed element.

As described in conjunction with FIG. 1, once the anchor has been adjusted, the process repeats with the acceptance of the next user input.

The following pseudo code implements step S5 (i.e., anchor adjustments) discussed above. Note that "widget" is used interchangeably with "displayed element" in this specification.

Pseudo Code for Anchor Adjustments
For Vertical Moves (Up/Down)
Inputs to this module are a new widget, a pseudo anchor and a flag indicating if the pseudo anchor overlaps with the new widget.

ADJUST_VERTICAL (newWidget, pseudoAnchor, isOverlapped)

1.0 if not Overlapped, adjust the geometry of the pseudo anchor to the new widgets geometry if (isOverlapped==FALSE)

LEFT (pseudoAnchor)=LEFT (newWidget)

RIGHT (pseudoAnchor)=RIGHT (newWidget)

TOP (pseudoAnchor)=TOP (newWidget)

BOTTOM (pseudoAnchor)=BOTTOM (newWidget)

2.0 else change the top and bottom values of the pseudoAnchor to that of the newWidgets TOP (pseudoAnchor)=TOP (newWidget)

BOTTOM (pseudoAnchor)=BOTTOM (newWidget)

2.1 adjust the left and right values of the pseudoAnchor with the horizontal overlap between the pseudoAnchor and the new Widget LEFT (pseudoAnchor)=MAXIMUM (LEFT (pseudoAnchor), LEFT (newWidget))

RIGHT (pseudoAnchor)=MINIMUM (RIGHT (pseudoAnchor), RIGHT (newWidget)).

For Horizontal Moves (Left/Right)
Inputs to this module are a new widget, a pseudo anchor and a flag indicating if the pseudo anchor overlaps with the new widget ADJUST_HORIZONTAL (newWidget, pseudoAnchor, isOverlapped)

1.0 if not Overlapped, adjust the geometry of the pseudo anchor to the new widgets geometry if (isOverlapped-FALSE)
    LEFT (pseudoAnchor)=LEFT (newWidget)
    RIGHT (pseudoAnchor)=RIGHT (newWidget)
    TOP (pseudoAnchor)=TOP (newWidget)
    BOTTOM (pseudoAnchor)=BOTTOM (newWidget)

2.0 else change the top and bottom values of the pseudo-Anchor to that of the newWidgets LEFT (pseudoAnchor)=LEFT (newWidget)
    RIGHT (pseudoAnchor)=RIGHT (newWidget)

2.1 adjust the left and right values of the pseudoAnchor with the vertical overlap between the pseudoAnchor and the newWidget TOP (pseudoAnchor)=MAXIMUM (TOP (pseudoAnchor), TOP (newWidget))
    BOTTOM (pseudoAnchor)=-MINIMUM (BOTTOM (pseudoAnchor), BOTTOM (newWidget))

Selection of Displayed Elements

An embodiment of a method for selecting the next displayed element will be described in conjunction with FIGS. 6–16.

Figure 6:
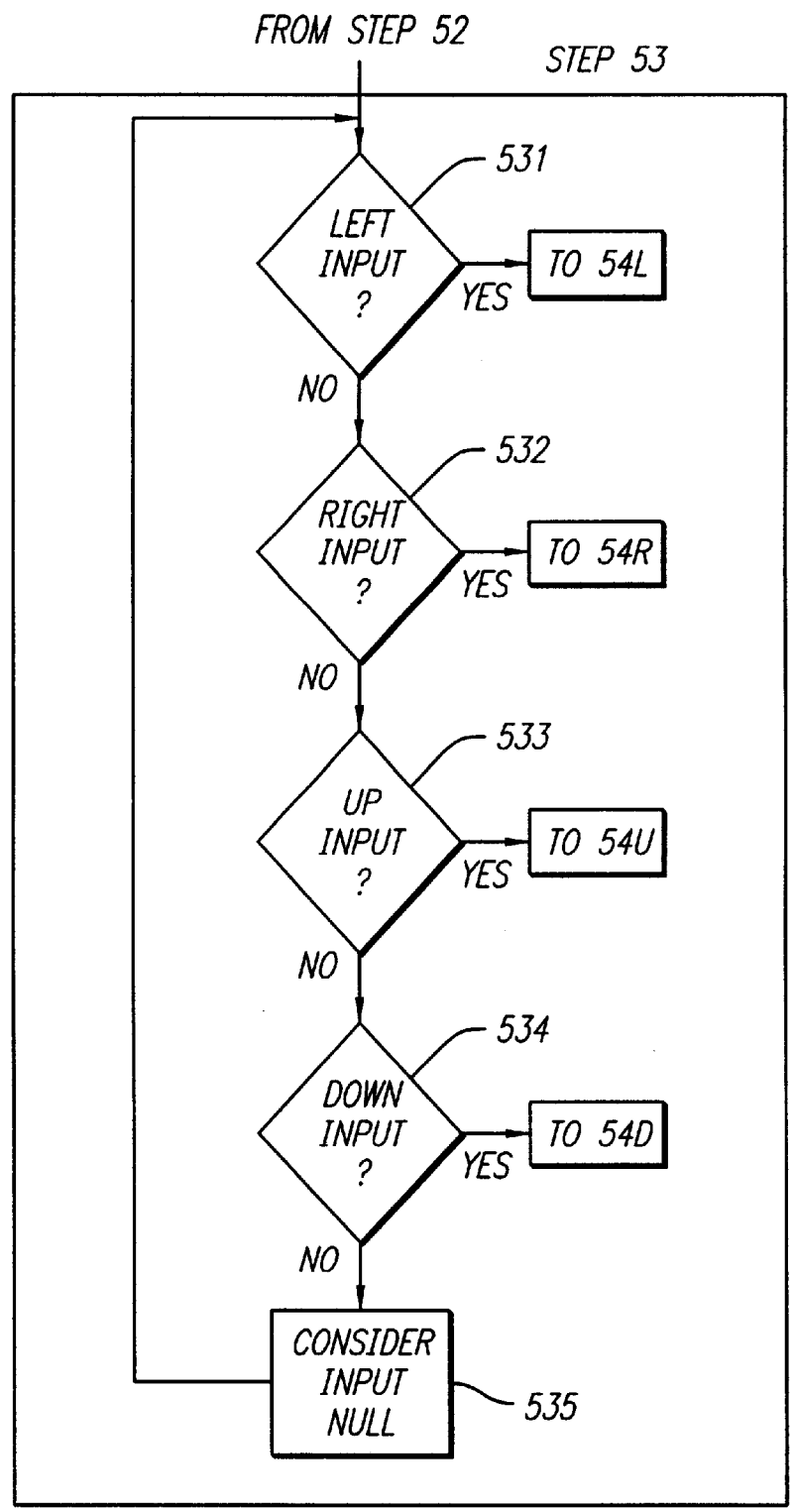
FIG. 6 is a flowchart generally illustrating a method for selecting a displayed element in response to a user input.

Referring to FIG. 6, after a user has input a navigation selection, in a step S31 it is determined if that input was a left input. If so, then the next displayed element is selected in accordance with step S4L. If not, in step S32 it is determined if the input was a right input. If so, then the next displayed element is selected in accordance with step S4R. If not, in a step S33 it is determined if the input was an up input. If so, then the next displayed element is selected in accordance with a step S4U. If not, in a step S34 it is determined if the input was a down input. If so, then the next displayed element is selected in accordance with a step S4D. If not, then in a step S35 it is determined that the user input is an invalid or null navigation input and the process repeats upon the entry of a new user input. An additional step or steps may be provided for determining if the user input is an input indicating a desire to end navigation, such as the pressing of the "escape" key for exiting the navigation mode.

Left Move

Figure 7:
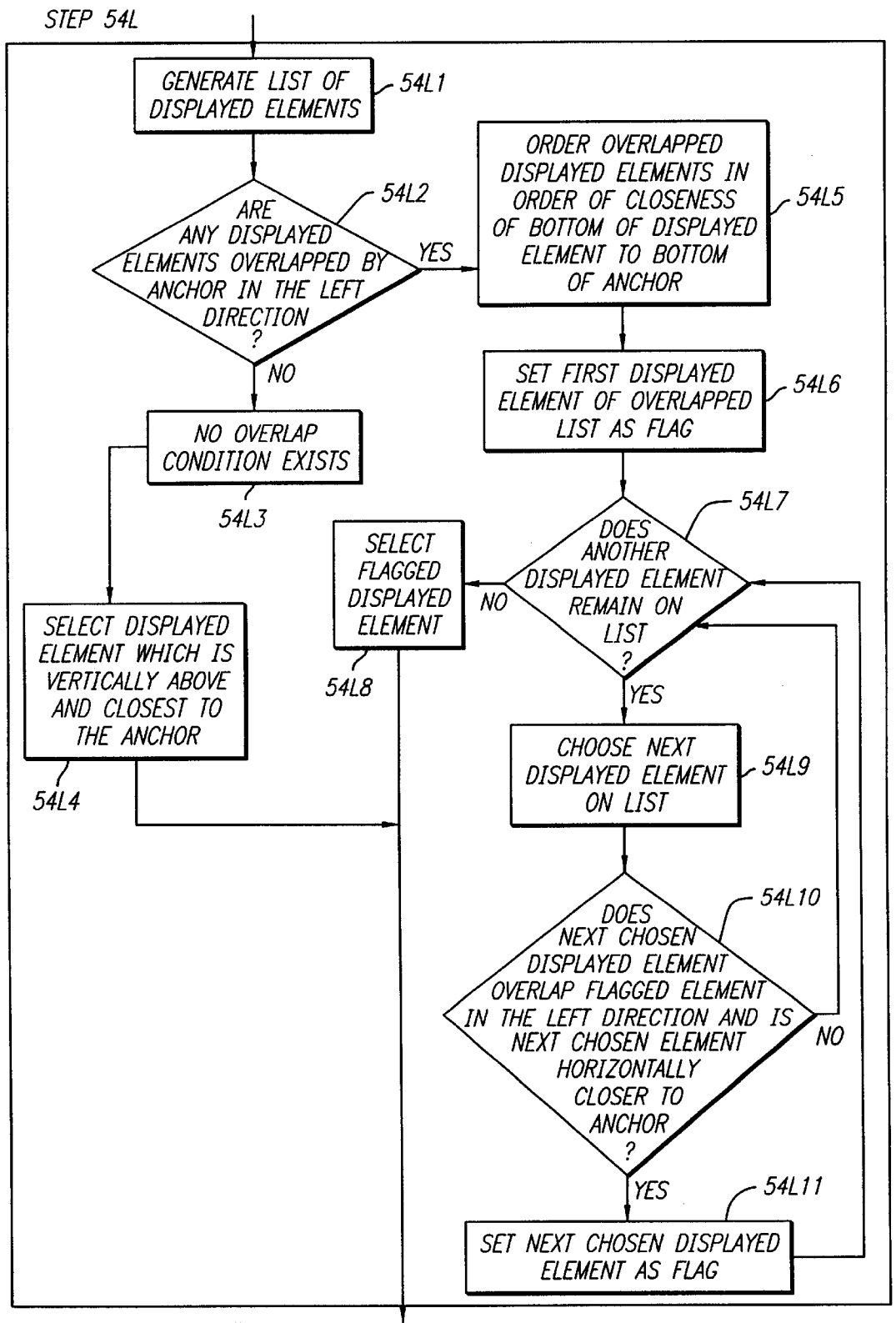
FIG. 7 is a flowchart illustrating in detail that portion of the method illustrated in FIG. 6 where the user input is a left navigation input.

The selection process in accordance with step S4L will be described in conjunction with FIGS. 7–8. In a step S4LU a list of the displayed elements is generated. In accordance with one embodiment of this process, displayed elements which are not visible (such as those fully clipped or concealed by another displayed element), those which are disabled or are not traversable, and the currently selected displayed element are not included in the list. In this manner, the list includes only those displayed elements which, if selected, will result in visible navigation to the user.

In a step S4L2, it is determined if any of the displayed elements in the list are overlapped by the anchor in the direction of movement (i.e. left). This is accomplished by determining if any of the displayed elements in the list fall within the projection of the anchor in the left direction.

If no displayed elements are overlapped, then in a step S4L3 it is determined that a no overlap condition exists. In a step S4L4 the displayed element which is selected from the list is that displayed element which is vertically above and closest to the anchor. In one embodiment, the bottom right corner of each displayed element is compared to the bottom of the anchor to determine if the displayed element is vertically above the anchor and (if above) the distance it is above the anchor.

Figure 8:
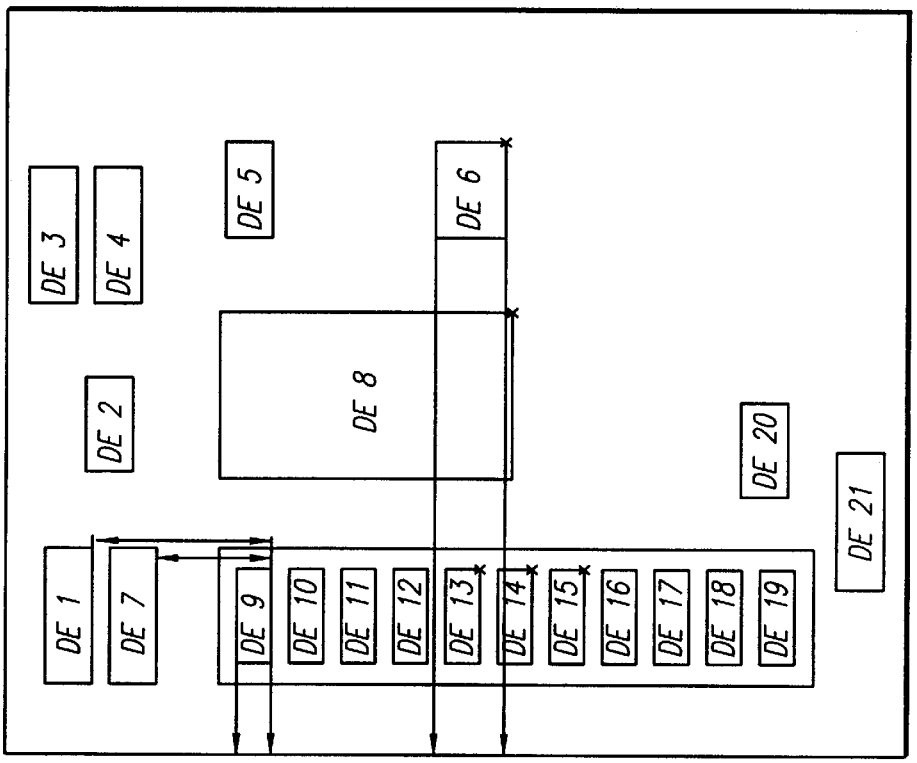
FIG. 8 illustrates examples of displayed element selection in response to a left navigation user input.
Figure 9:
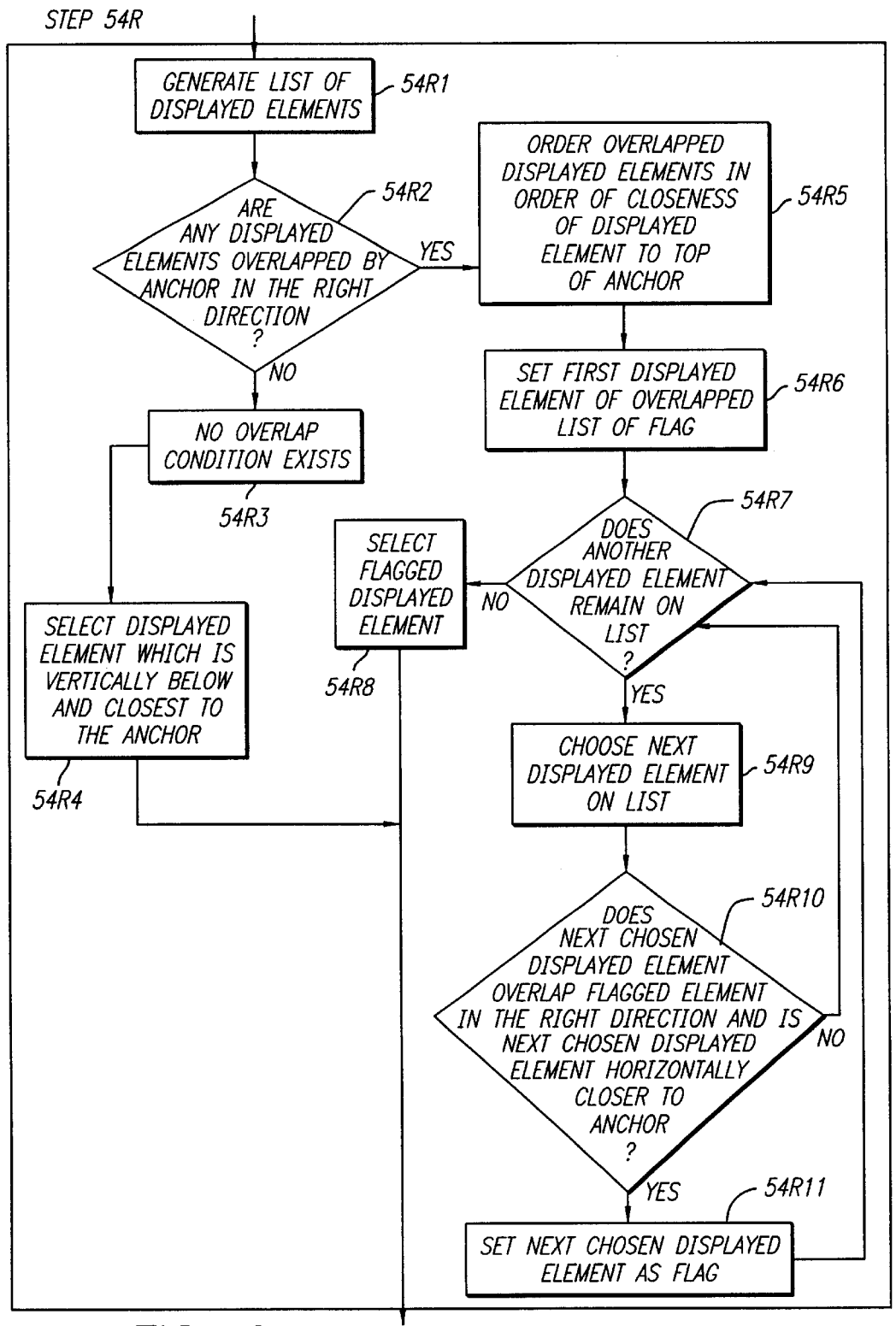
FIG. 9 is a flowchart illustrating in detail that portion of the method illustrated in FIG. 6 where the user input is a right navigation input.

An example of these steps is illustrated in FIG. 8. Assume that displayed element DE9 is the currently selected displayed element and that the anchor has the same geometry as this displayed element. In the event of a left input by the user, in a step S4L2 it is determined that there are no displayed elements which are overlapped by the anchor in the left direction. As such, in step S4L4 it is determined that the next selected displayed element is displayed element DE7, since this displayed element is vertically above DE9 and has its bottom right corner closest to the bottom of the anchor than the other displayed element which is vertically above the anchor (i.e. the bottom right corner of DE7 is closer than the bottom right corner of DE1 to the bottom of the anchor).

If in step S4L2 it is determined that at least one displayed element in the list is overlapped, then in a step S4L5 a list of all overlapped displayed elements is generated in order of the closeness of the displayed element to the anchor. In one embodiment, the closeness is based on the vertical distance between the bottom right corner of the displayed element to the bottom right corner of the anchor.

In a step S4L6 the first displayed element on this list is set as a flagged element.

In a step SIL is determined if there are any other elements on the list. If not (i.e. there is only one displayed element on the list, and thus only one displayed element which is overlapped) then this displayed element is, in step S4L8, determined to be the next selected displayed element.

If in step S4L7 it is determined that there is another element on the list, this element is chosen in step S4L9. In a step S4L10 it is determined if this next chosen displayed element both overlaps the flagged displayed element in the direction of movement (i.e. does the next element, when projected in the left direction, intersect at least a portion of the flagged displayed element) and if the next chosen displayed element is horizontally closer to the anchor. If not, then the process repeats at step S4L7. If so, then this displayed element is now set as the flag in step S4L11. The process then repeats at step S4L7.

An example is illustrated in FIG. 8. Assume that the currently selected displayed element is DE6 (and the anchor has the same geometry) and a left move is input by the user. In step S4L2 it is determined that displayed elements DE8, DE13, DE14 and DE15 are overlapped by the anchor in the left direction. These displayed elements are ordered DE14, DE15, DE8 and DE13 in step S4L5 in accordance with the vertical closeness of their bottom right corners to the bottom of the anchor. In step S4L6 displayed element DE14 is flagged. In step S4L9 displayed element DE15 is next selected, but is not horizontally closer in step S4L10. In step S4L6 displayed element DE8 is next selected. In step S4L10 it is determined that this diplayed element has its bottom right corner horizontally closer (than the bottom right corner of DE14) and DE8 overlaps DE14. Thus, DE8 is set as the flag in step S4L11. In step S4L7, DE13 is the next chosen element, but in step S4L10 it is determined that this element is not horizontally closer than DE8. In step S4L7 it is determined that no other displayed elements remain on the overlapped list, and in step S4L8 displayed element DE8 is selected.

After selection of the next displayed element, the process continues at step S5 (see FIG. 2) where the anchor is adjusted.

The following pseudo code implements step S4L (i.e., Left Moves) discussed above. Note that "widget" is used interchangeably with "displayed element" in this specification. The pseudo code implements a search engine which has as inputs a list of displayed elements, the current anchor and the currently selected displayed element. The search engine is arranged to iterate through the list of displayed elements to determine the next displayed element to select in accordance with step S4L as described and illustrated above.

Pseudo Code for Left Moves

Inputs to this module are a list of widgets/links sorted based on bottom-right corner points, a currently focused widget and the pseudo anchor.

1.0 Initializations
   initialize closestx to a very big value
   initialize recipient to NULL
   initialize "overlapped" flag to TRUE
      closestX=MAXVAL
      recipient=NULL
      overlapped=TRUE
2.0 Get the current pseudo anchor point and initialize
      anchorX=RIGHT (pseudoAnchor)
3.0 Iterate thru the list of widgets using thisWidget
      thisWidget=NEXT ( sorted list)
3.1 If thisWidget is invisible or disabled or not focus-traversable skip to the next widget. A widget is visible if it and its containers are visible.
      if NOT (VISIBLE (thisWidget) AND ISFOCUSTRAVERSABLE (thisWidget)
         AND ENABLED (thisWidget))
      skip
3.2 If thisWidget is fully clipped by its containers skip to next widget
      if CLIPPEDFULLY (thisWidget)
      skip
3.3 skip if currentwidget is same as thisWidget
      if (currentlywidget==thisWidget)
      skip
3.4 get thisWidget's bottom-right corner point. One might use bottom-left corner, if widgets are guaranteed not to overlap each other.
      widgetX=RIGHT (thisWidget)
      widgetY=BOTTOM (thisWidget)
3.5 To optimize, one might check if the thisWidget is on the left of the pseudoAnchor, else skip to next widget from the list
3.6 To further optimize, one might terminate the search process when the bottom of thisWidget is already above the top of the pseudoAnchor
      if (BOTTOM (thisWidget) above TOP (pseudoAnchor)
         terminate search and return recipient as the next appropriate widget
3.7 Compute the amount of vertical overlapping thisWidget has with the pseudoAnchor.
      overlap=VERT_OVERLAP (thisWidget and pseudoAnchor)
3.7.1 If thisWidget vertically overlaps with the pseudoAnchor, mark it as a probable recipient if
      the recipient is NULL ie. its the first overlapped widget in the sorted list and is closes to the bottom of the pseudoAnchor. Or
      thisWidget is horizontally closer to the pseudoAnchor and it vertically overlaps with the previously marked recipient if ((recipient==NULL OR\(deltaX<closestX AND VERT_OVERLAP (&widWin, &recipient->w->window))))
   if so, set the closestX distance and mark it as a probable recipient
      closestX=deltaX;
      recipient=thisWidget;
4.0 If no recipient was found, its time to wrap around.
4.1 Iterate thru the widget list starting with the currently focused widget until it comes across a widget which is vertically above the pseudoAnchor's top point.
      thisWidget=NEXT (widgetList
4.2 if widget is above the pseudoAnchor, mark it as a recipient, set the overlapped flag to FALSE and terminate the iterations.
      if (thisWidget above TOP (pseudoAnchor))
         recipient=thisWidget
         overlapped=FALSE
5.0 if a valid recipient, adjust the pseudoAnchor
      if (recipient!=NULL)
         ADJUST_HORIZONTAL (pseudoAnchor, recipient, overlapped)
6.0 return recipient Right Move The selection process in accordance with step S4R will be described in conjunction with FIGS. 9–11. In a step S4R1 a list of the displayed elements is generated. In accordance with one embodiment of this process, displayed elements which are not visible (such as those fully clipped or concealed by another displayed element), those which are disabled or not traversable, and the currently selected displayed element are not included on this list.

In a step S4R2, it is determined if any of the displayed elements in that list are overlapped by the anchor in the direction of movement (i.e. right). This is accomplished by determining if any of the displayed elements in the list fall within the projection of the anchor in the right direction.

If no displayed elements are overlapped, then in a step S4R3 it is determined that a no overlap condition exists. In a step S4R4 the displayed element is selected from the list which is vertically below and closest to the anchor. In one embodiment, the top left corner of each displayed element is compared to the top left corner of the anchor to determine if the diplayed element is vertically below the top of the anchor and, if below, that distance which the displayed element is below the anchor.

Figure 10:
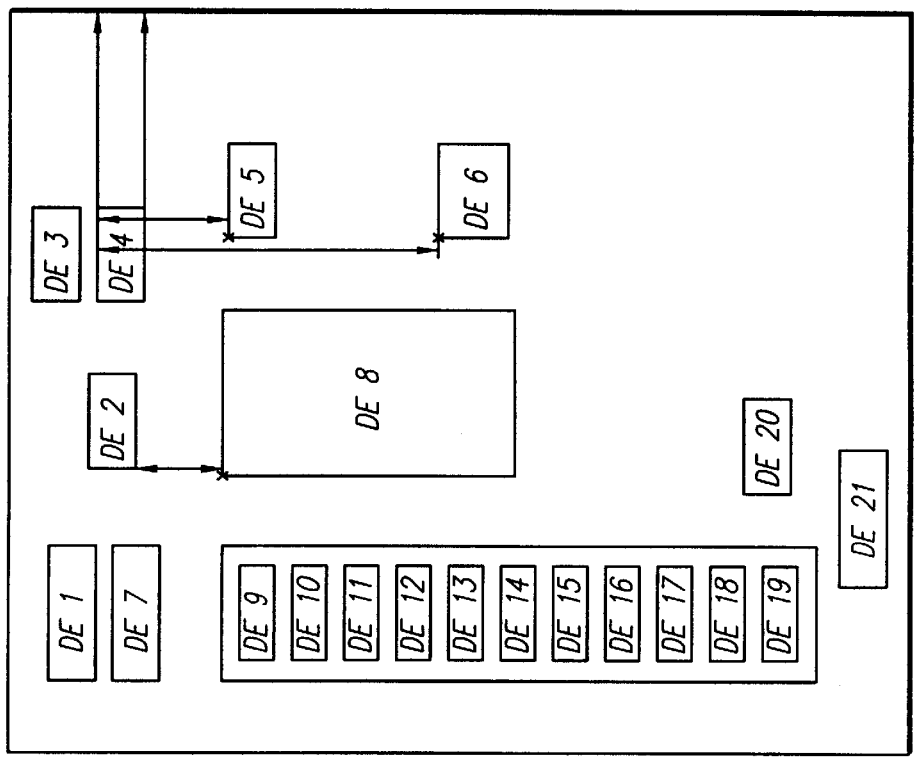
FIG. 10 illustrates an example displayed element selection in response to a right navigation user input.

An example of these steps is illustrated in FIG. 10. Assume that displayed element DE4 is the currently selected displayed element and that the anchor has the same geometry as this displayed element. In the event of a right input by the user, in a step S4R2 it is determined that there are no displayed elements which are overlapped by the anchor in the right direction. As such, in step S4R4 it is determined that the next selected displayed element is displayed element DE8, since this displayed element is vertically below the anchor and has its top left corner closer to the top of the anchor than the other displayed elements which are vertically below the anchor (i.e. is closer than DE5 and DE6).

If in step S4R2 it is determined that at least one displayed element in the list is overlapped, then in a step S4R5 a list of all overlapped displayed elements is generated in order of the closeness of the displayed element to the anchor. In one embodiment, the closeness is based on the vertical distance between the top left corner of the displayed element to the top left corner of the anchor.

In a step S4R6 the first displayed element on this list is set as a flagged element.

In a step S4R7 is determined if there are any other elements on the list. If not (i.e. there is only one displayed element on the list, and thus only one displayed element which is overlapped) then this displayed element is, in step S4R8, the next selected displayed element.

If in step S4R7 it is determined that there is another element on the list, this element is chosen in step S4R9. In a step S4R10 it is determined if this next chosen displayed element both overlaps the flagged displayed element in the direction of movement (i.e. does the next element, when projected in the right direction, intersect at least a portion of the flagged displayed element) and if the next chosen displayed element is horizontally closer to the anchor. If not, then the process repeats at step S4R7. If so, then this displayed element is now set as the flag in step S4R11. The process then repeats at step S4R7.

Figure 11:
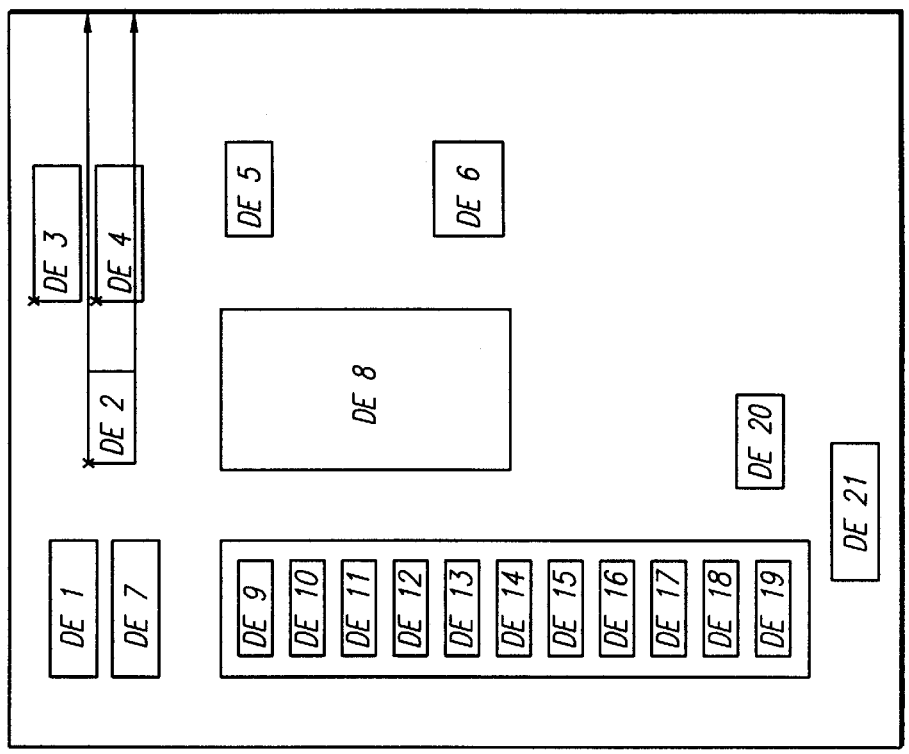
FIG. 11 illustrates another example displayed element selection in response to a right navigation user input.

An example is illustrated in FIG. 11. Assume that the currently selected displayed element is DE2 (and the anchor has the same geometry) and a right move is input by the user. In step S4R2 it is determined that displayed elements DE3 and DE4 are overlapped by the anchor in the left direction. These displayed elements are ordered DE4, DE3 in step S4R5 in accordance with the vertical closeness of their top left corners to the top of the anchor. In step S4R6 displayed element DE4 is flagged. In step S4R9 displayed element DE3 is next selected, but is not horizontally closer in step S4R10. In step S4R7 it is determined that no other displayed elements remain on the overlapped list, and in step S4R8 displayed element DE4 is selected.

After selection of the next displayed element, the process continues at step S5 (see FIG. 2) where the anchor is adjusted.

The following pseudo code implements step S4R (i.e., Right Moves) discussed above. Note that "widget" is used interchangeably with "displayed element" in this specification. The pseudo code implements a search engine which has as inputs a list of displayed elements, the current anchor and the currently selected displayed element. The search engine is arranged to iterate through the list of displayed elements to determine the next displayed element to select in accordance with step S4R as described and illustrated above.

Pseudo Code for Right Moves

Inputs to this module are a list of widgets/links sorted based on the top-left corner, the currently focused widget and the pseudo anchor.

1.0 Initializations
   initialize closestX to a very big value
   initialize recipient to NULL
   initialize "overlapped" flag to TRUE
      closestX=MAXVAL
      recipient=NULL
      overlapped=TRUE
2.0 Get the current pseudo anchor point and initialize
   anchorX=LEFT (pseudoAnchor)
3.0 Iterate thru the list of widgets using thisWidget
   thisWidget=NEXT (sorted list)
3.1 If thisWidget is invisible or disabled or not focus-traversable skip to the next widget. A widget is visible if it and its containers are visible.
   if NOT (VISIBLE(thisWidget) AND ISFOCUSTRA-VERSABLE (thisWidget) AND ENABLED (thisWidget))
   skip
3.2 If thisWidget is fully clipped by its containers, skip to the next widget
   if CLIPPEDFULLY (thisWidget)
   skip
3.3 skip if the currentwidget is the same as thisWidget
   if (currentwidget==thisWidget)
   skip
3.4 get thisWidget's top-left corner point. One might use the bottom-left corner, if the widgets are guaranteed not to overlap with each other.
   widgetX=LEFT (thisWidget)
   widgetY=TOP (thisWidget)
3.5 To optimize, one might check if the thisWidget is on the right of the pseudoAnchor, else skip to the next widget from the list
   if (widgetX<anchorX) assuming that the X axis grows from the left to right, which
   skip might not be true with every implementation.
3.6 To further optimize, one might terminate the search process with the top of thisWidget is already below the bottom of the pseudoAnchor if (TOP (thisWidget) above BOTTOM(pseudoAnchor) terminate search and return recipient as the next appropriate widget
3.7 Compute the amount of vertical overlap that thisWidget has with the pseudoAnchor.
   overlap=VERT_OVERLAP (thisWidget and pseudoAnchor)
3.7.1 If thisWidget vertically overlaps with the pseudoAnchor, mark it as a probable recipient if
   recipient is NULL ie. its the first overlapped widget in the sorted list and is closest to the top of the pseudoAnchor. Or
   thisWidget is horizontally closer to the pseudoAnchor and it vertically overlaps with the previously marked recipient
   if ((recipient==NULL OR
     (deltaX<closestX AND VERT_OVERLAP (widWin, recipient->w->window))))
   if so, set the closestX distance and mark it as probable recipient
   closestX=deltaX;
   recipient=thisWidget;
4.0 If no recipient was found, its time to wrap around.
4.1 Iterate thru the widget list starting with the currently focused widget until it becomes across a widget which is vertically below the pseudoAnchor's bottom point.
   thisWidget=NEXT (widgetList)
4.2 if the widget is below the pseudoAnchor mark it as the recipient and terminate the iterations.
   if (thisWidget below BOTTOM (pseudoAnchor))
   recipient=thisWidget
   overlapped=FALSE
5.0 if a valid recipient adjust the pseudoAnchor
   if (recipient!=NULL)
   ADJUST_HORIZONTAL (pseudoAnchor, recipient, overlapped)
6.0 return recipient Up Move The selection process in accordance with step S4U will be described in conjunction with FIGS. 12–13. In a step S4U1 a list of the displayed elements is generated. In accordance with one embodiment of this process, displayed elements which are not visible (such as those fully clipped or concealed by another displayed element), those which are disabled or not traversable, and the currently selected displayed element are not included on this list.

In a step S4U2, it is determined if any of the displayed elements in that list are overlapped by the anchor in the direction of movement (i.e. up). This is accomplished by determining if any of the displayed elements in the list fall within the projection of the anchor in the up direction.

If no displayed elements are overlapped, then in a step S4U3 it is determined that a no overlap condition exists. In a step S4U4 the displayed element is selected from the list which is closest both vertically and horizontally to the anchor. In one embodiment, the bottom right corner of each displayed element is compared to the bottom right corner of the anchor. In accordance with one embodiment, the total distance is determined by adding the horizontal and vertical distance. In accordance with another embodiment, the total distance is determined in accordance with the Pythagorean theorem to find the straight line distance.

Figure 13:
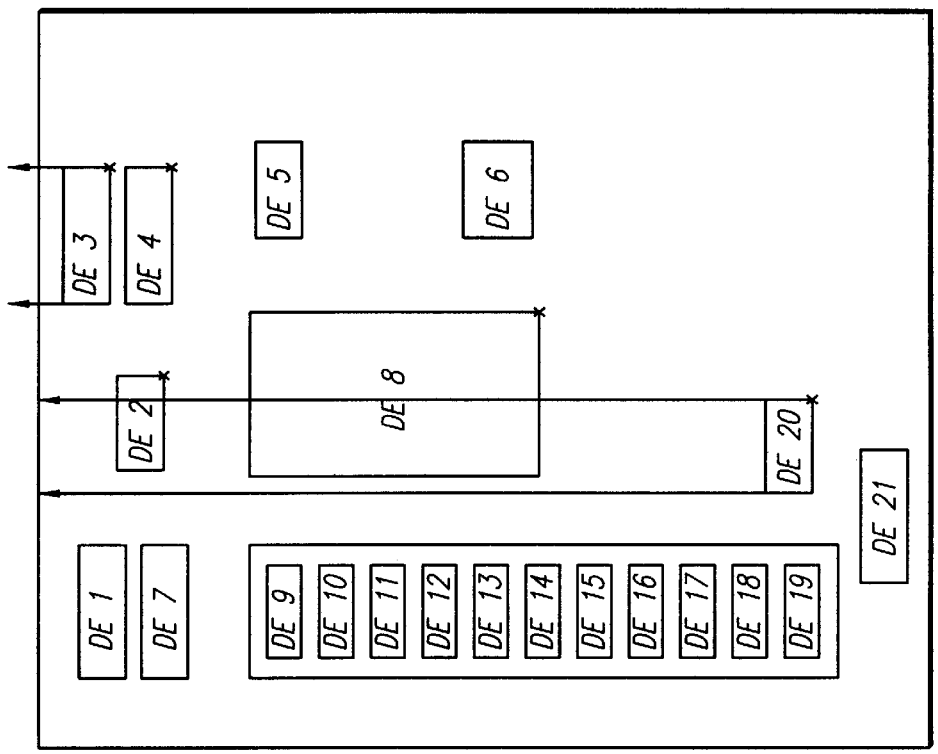
FIG. 13 illustrates examples of displayed element selection in response to an up navigation user input.

An example of these steps is illustrated in FIG. 13. Assume that displayed element DE3 is the currently selected displayed element and that the anchor has the same geometry as this displayed element. In the event of an up input by the user, in a step S4U2 it is determined that there are no displayed elements which are overlapped by the anchor in the up direction. As such, in step S4U4 it is determined that the next selected displayed element is displayed element DE4, since this displayed element has its bottom right corner closest to horizontally and vertically to the bottom right corner of the anchor.

If in step S4U2 it is determined that at least one displayed element in the list is overlapped, then in a step S4U5 the overlapped displayed element which is vertically closest to the anchor is selected. In one embodiment, the vertical closeness is based on the distance between the bottom right corner of the displayed element to the bottom right corner of the anchor.

An example is illustrated in FIG. 13. Assume that the currently selected displayed element is DE20 (and the anchor has the same geometry) and a up move is input by the user. In step S4U2 it is determined that displayed elements DE8 and DE2 are overlapped by the anchor in the up or vertical direction. The displayed element DE8 is selected in step S4U5 since the bottom right corner of DE8 is vertically closest to the bottom right corner of the anchor.

After selection of the next displayed element, the process continues at step S5 (see FIG. 2) where the anchor is adjusted.

The following pseudo code implements step S4U (i.e., Up Moves) discussed above. Note that "widget" is used interchangeably with "displayed element" in this specification. The pseudo code implements a search engine which has as inputs a list of displayed elements, the current anchor and the currently selected displayed element. The search engine is arranged to iterate through the list of displayed elements to determine the next displayed element to select in accordance with step S4U as described and illustrated above.

Pseudo Code for Up Moves

Inputs to this module are a list of widgets/links sorted based on the bottom-right corner, the currently focused widget and the pseudo anchor.

1.0 Initializations
   initialize closestY, closestDistance to very big values
   initialize recipient to NULL
   initialize overlapped flag to TRUE
      closestY=MAXVAL
      closestDistance=MAXVAL
      recipient=NULL
      overlapped=FALSE
2.0 Get the current pseudo anchor point and initialize
   anchorX=RIGHT (pseudoAnchor)
   anchorY=BOTTOM (pseudoAnchor)

3.0 If thisWidget is invisible or disabled or not focus-traversable skip to the next widget. A widget is visible if it and its containers are visible.
   if NOT (VISIBLE(thisWidget) AND ISFOCUSTRAVERSABLE (thisWidget) AND ENABLED (thisWidget))
      skip
3.2 If thisWidget is fully clipped by its containers, skip to the next widget
   if CLIPPEDFULLY (thisWidget)
      skip
3.3 skip if the currentwidget is the same as thisWidget
   if (currentwidget==thisWidget)
      skip
3.4 get thisWidget's bottom-right corner point. One might use the bottom-left corner, if widgets are guaranteed not to overlap with each other.
   widgetX=RIGHT (thisWidget)
   wiedgetY=BOTTOM (thisWidget)
3.5 To optimize, one might check if the thisWidget is below the pseudoAnchor, else skip to the next widget from the list
   if (widgetY>anchorY) assuming the Y axis grows from top to bottom, which
   skip might not be true with ever implementation.
3.6 Compute the amount of horizontal overlapping thisWidget has with the pseudoAnchor.
   overlap=HORI_OVERLAP (thisWidget and pseudoAnchor)
3.6.1 If thisWidget horizontally overlaps with the pseudoAnchor, mark it as a probable recipient if its vertically closest to the top of the pseudoAnchor. If so, set the closestY distance and mark it as a probable recipient
   if (deltaY<closestY)
      closestY=deltaY;
      recipient=thisWidget;
      overlapped=TRUE
3.7 If no recipient was found
3.7.1 Compute the horizontal distance and the vertical distance between the pseudoAnchor and thisWidget
   distance=HORI_DISTANCE (pseudoAnchor, thisWidget)+VERT_DISTANCE (pseudoAnchor, thisWidget)
3.7.2 if this distance is closer than closestDistance, mark the widget as a recipient and set the closestDistance
   recipient=thisWidget
   closestDistance=distance
4.0 if a valid recipient adjust the pseudoAnchor
   if (recipient!=NULL)
      ADJUST_VERTICAL (pseudoAnchor, recipient, overlapped)
5.0 return recipient Down Move The selection process in accordance with step S4D will be described in conjunction with FIGS. 14–15. In a step S4D1 a list of the displayed elements is generated. In accordance with one embodiment of this process, displayed elements which are not visible (such as those fully clipped or concealed by another displayed element), those which are disabled or not traversable, and the currently selected displayed element are not included on this list.

In a step S4D2, it is determined if any of the displayed elements in that list are overlapped by the anchor in the direction of movement (i.e. down). This is accomplished by determining if any of the displayed elements in the list fall within the projection of the anchor in the down direction.

If no displayed elements are overlapped, then in a step S4D3 it is determined that a no overlap condition exists. In a step S4D4 the displayed element is selected from the list which is closest both vertically and horizontally to the anchor. In one embodiment, the top left corner of each displayed element is compared to the top left corner of the anchor. In accordance with one embodiment, the total distance is determined by adding the horizontal and vertical distance. In accordance with another embodiment, the total distance is determined in accordance with the Pythagorean theorem to find the straight line distance.

Figure 15:
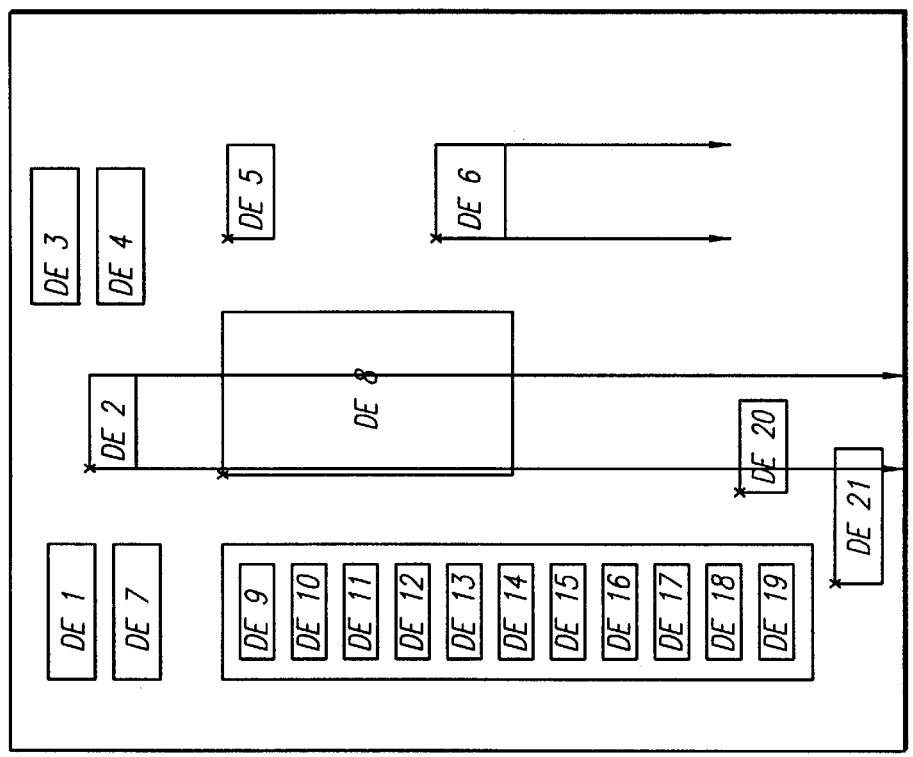
FIG. 15 illustrates examples of displayed element selection in response to a down navigation user input.

An example of these steps is illustrated in FIG. 15. Assume that displayed element DE6 is the currently selected displayed element and that the anchor has the same geometry as this displayed element. In the event of a down input by the user, in a step S4D2 it is determined that there are no displayed elements which are overlapped by the anchor in the down direction. As such, in step S4D4 it is determined that the next selected displayed element is displayed element DE5, since this displayed element has its top left corner closest to horizontally and vertically to the top left corner of the anchor (as compared to the other closest displayed elements DE8 and DE20).

If in step S4D2 it is determined that at least one displayed element in the list is overlapped, then in a step S4D5 the overlapped displayed element which is vertically closest to the anchor is selected. In one embodiment, the vertical closeness is based on the distance between the top left corner of the displayed element to the top left corner of the anchor.

An example is illustrated in FIG. 15. Assume that the currently selected displayed element is DE2 (and the anchor has the same geometry) and a down move is input by the user. In step S4D2 it is determined that displayed elements DE8, DE20 and DE21 are overlapped by the anchor in the down direction. The displayed element DE8 is selected in step S4D5 since the top left corner of DE8 is vertically closest to the top left corner of the anchor.

After selection of the next displayed element, the process continues at step S5 (see FIG. 2) where the anchor is adjusted.

The following pseudo code implements step S4D (i.e., Down Moves) discussed above. Note that "widget" is used interchangeably with "displayed element" in this specification. The pseudo code implements a search engine which has as inputs a list of displayed elements, the current anchor and the currently selected displayed element. The search engine is arranged to iterate through the list of displayed elements to determine the next displayed element to select in accordance with step S4D as described and illustrated above.

Pseudo Code for Down Moves
Inputs to this module are a list of widgets/links sorted based on top-left corner, the currently focused widget and the pseudo anchor.
1.0 Initializations
   initialize closestY, closestDistance to very big values
   initialize recipient to NULL
   initialize overlapped flag to TRUE
     closestY=MAXVAL
     closestDistance=MAXVAL
     recipient=NULL
     overlapped=FALSE
2.0 Get the current pseudo anchor point and initialize
   anchorX=LEFT (pseudo Anchor)
   anchorY=FALSE (pseudo Anchor)
3.0 Iterate thru the list of widgets using thisWidget
   thisWidget=NEXT (sorted list)
3.1 If thisWidget is invisible or disabled or not focus-traversable skip to next widget. A widget is visible if it and its containers are visible.
   if NOT (VISIBLE(thisWidget) AND ISFOCUSTRAVERSABLE(thisWidget) AND ENABLED(thisWidget)
     skip
3.2 If thisWidget is fully clipped by its containers skip to the next widget if
   CLIPPEDFULLY (thisWidget)
     skip
3.3 skip if the currentwidget is the same as thisWidget
   if (currentwidget==thisWidget)
     skip
3.4 get thisWidget's top-left corner point. One might use the top-right corner, if widgets are guaranteed not to overlap with each other.
   widgetX=LEFT (thisWidget)
   widgetY=TOP (thisWidget)
3.5 To optimize, one might check if the thisWidget is below the pseudoAnchor, else skip to the next widget from the list
   if (widgetY<anchorY) assuming Y axis grows from top to bottom, which skip might not be true with ever implementation.
3.6 Compute the amount of horizontal overlapping thisWidget has with the pseudoAnchor.
   overlap=HORI_OVERLAP (thisWidget and pseudoAnchor)
3.6.1 If thisWidget horizontally overlaps with the pseudoAnchor, mark it as a probable recipient, if its vertically closest to the top of the pseudoAnchor. If so, set the closestY distance and mark it as a probable recipient
   if (deltaY<closestY)
     closestY=deltaY;
     recipient=thisWidget;
     overlapped=TRUE
3.7 If no recipient was found
3.7.1 Compute the Horizontal distance and the vertical distance between the pseudoAnchor and thisWidget
   distance=HORI_DISTANCE (pseudoAnchor, thisWidget)+VERT_DISTANCE (pseudoAnchor, thisWidget)
3.7.2 if this distance is closer than closestDistance, mark the widget as a recipient
   and set the closestDistance
   recipient=thisWidget
   closestDistance=distance
4.0 if a valid recipient, adjust the pseudoAnchor
   if (recipient!=NULL)
     ADJUST_VERTICAL (pseudoAnchor, recipient, overlapped)
5.0 return recipient The above-stated method applies to displayed elements which actually overlap one another (i.e. are positioned at least partially over the top of one another). As stated above, in accordance with one embodiment of the invention is not desirable to select for navigation a particular displayed element which is completely clipped or hidden, such as when one displayed element is positioned entirely below or behind another. In accordance with an embodiment of the invention, however, displayed elements may be selected during navigation if at least partly visible.

Figure 16:
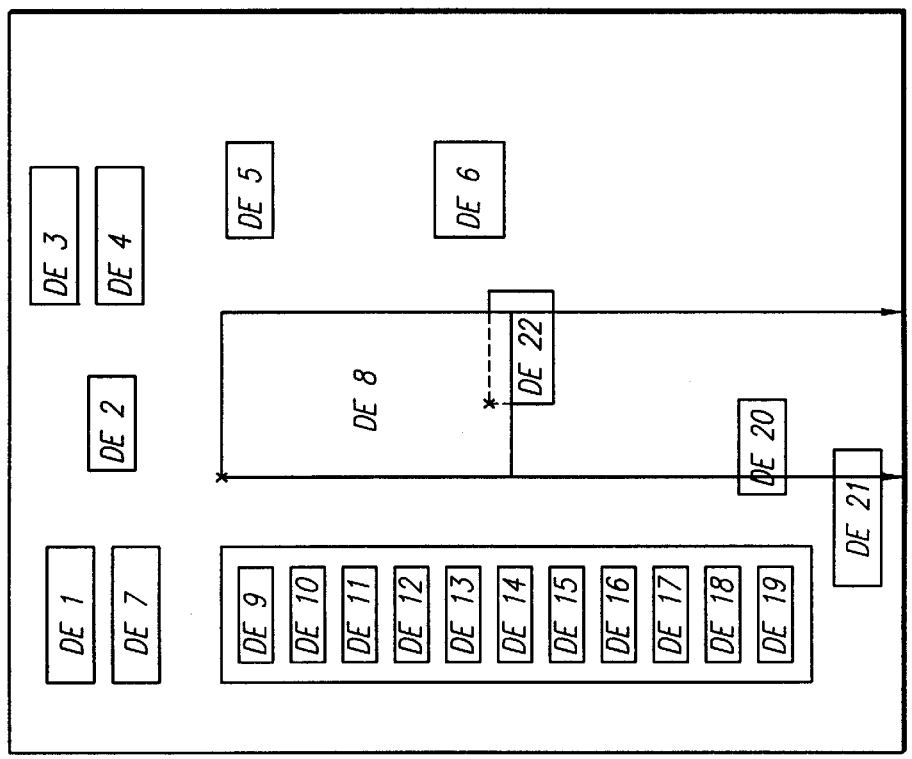
FIG. 16 illustrates an example of displayed element selection in the case of overlapping displayed elements.

FIG. 16 illustrates such a situation, where displayed element DE22 is located partially behind displayed element DE8. In accordance with an embodiment of the invention, the same steps detailed above may be used to navigate the displayed elements. As an example, assume that DE8 is the currently selected displayed element and that the anchor has the same geometry as DE8. In the event of a down input by a user, displayed element DE22 is selected since this displayed element is overlapped by the anchor in the direction of input and DE8 has a top left corner which is closer to the top left corner of the anchor than the other overlapped displayed element (i.e. DE20, DE21).

The above-described method permits navigation of displayed elements without grouping of the displayed elements. All displayed elements are navigatible with one set of inputs. This avoids, such as in the prior art, the grouping of displayed elements so that sets of elements may be navigated by use of differing inputs. For example, referring to FIG. 2, the displayed elements DE9–19, while all positioned within a common compartment, are accessible with the same user-inputs as those outside the compartment.

The method also does not require the assumption that all elements are of the same size or aligned along imaginary paths. Instead, the navigation is dependent on the actual size and location of the displayed elements.

The method of the invention makes navigation predictable and guarantees navigation to all displayed elements. The method generally results in the same navigation path in opposite directions.

In the examples illustrated above, the displayed elements all had a square or rectangular shape. It is not necessary for the displayed elements or the anchor to be limited to such a shape. In accordance with one embodiment, the displayed elements are converted to a square or rectangular shape by defining the smallest such geometry which encompasses the actual shape of the displayed element. In one or more embodiments, the actual shape of the displayed element is utilized in the above-described method. For example, if a displayed element has the shape of a triangle, the top left and top right corners of the displayed element may comprise the top point of the triangle, and the bottom left and bottom right corners the bottom two corners of the triangle.

In one or more embodiments, reference points other than those described above may be used, such as in determining the closeness of the displayed elements to the anchor. For example, in the case of a left input where no displayed elements are overlapped, the bottom left corner of each displayed element may be compared to the bottom left corner of the anchor to determine which displayed element is vertically closest to and above the anchor and is to be selected. As another example, in the case of a right input where no displayed elements are overlapped, the top right corner of each displayed element may be compared to the top right corner of the anchor to determine which displayed element is vertically closest to and below the anchor and is to be selected. In addition, the exact corner points of the displayed elements and anchor need to not be used, but other suitable points may be selected.

Embodiment of Computer Execution Environment (Hardware)

Figure 17:
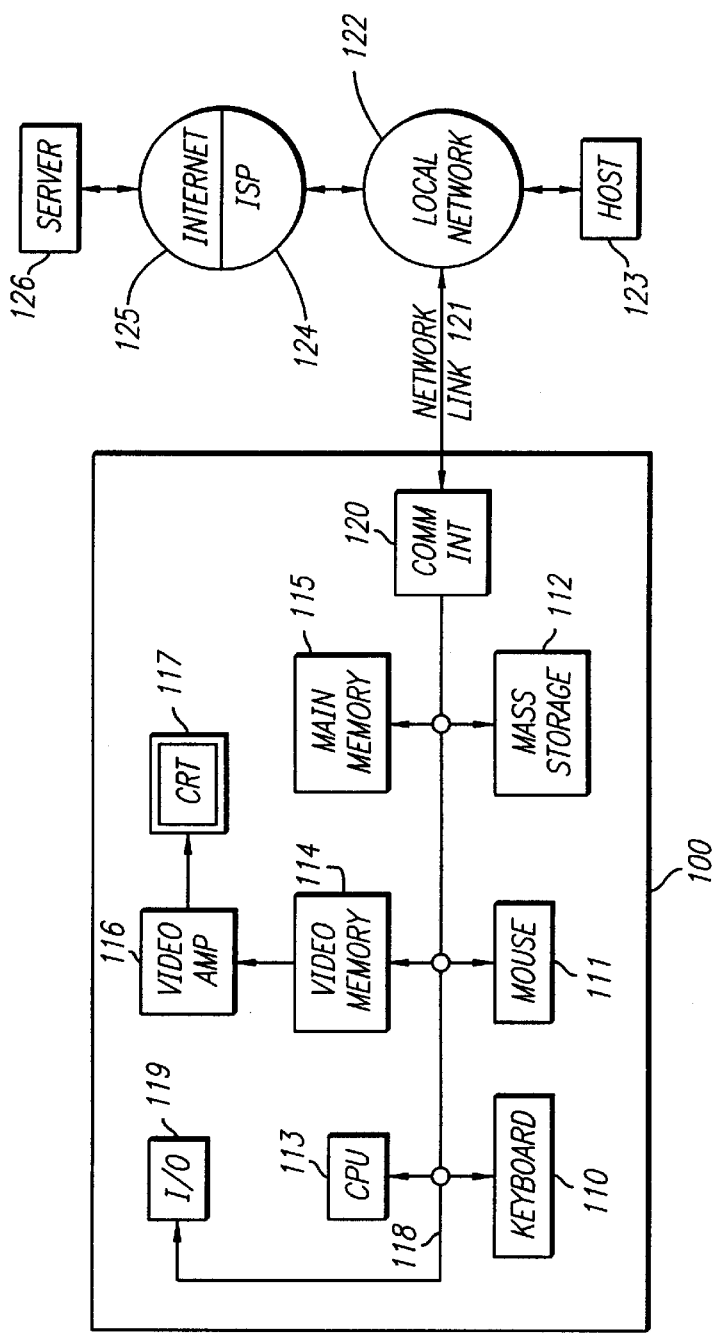
FIG. 17 is a block diagram of one embodiment of a computer system capable of providing a suitable execution environment for an embodiment of the invention.

An embodiment of the invention can be implemented as computer software in the form of computer readable code executed on a general purpose computer such as the computer 100 illustrated in FIG. 17, or in the form of bytecode class files executable within a Javal™ runtime environment running on such a computer.

Such a computer 100 may include, but is not limited to that illustrated in FIG. 17. In this arrangement, the computer 100 includes a keyboard 110 and mouse 111 coupled to a system bus 118. The keyboard and mouse are for introducing user input to the computer system and communicating that user input to processor 113. Other suitable input devices may be used in addition to, or in place of, the mouse 111 and keyboard 110. I/O (input/output) unit 119 coupled to system bus 118 represents such I/O elements as a printer, A/V (audio/video) I/O, etc.

Computer 100 includes a video memory 114, main memory 115 and mass storage 112, all coupled to system bus 118 along with keyboard 110, mouse 111 and processor 113. The mass storage 112 may include both fixed and removable media, such as magnetic, optical or magnetic optical storage systems or any other available mass storage technology. Bus 118 may contain, for example, sixty-four address lines for addressing video memory 114 or main memory 115. The system bus 118 also includes, for example, a 64-bit data bus for transferring data between and among the components, such as processor 113, main memory 115, video memory 114 and mass storage 112. Alternatively, multiplex data/address lines may be used instead of separate data and address lines.

In one embodiment of the invention, the processor 113 is a microprocessor manufactured by Sun Microsystems, Inc., such as a SPARC™ microprocessor, or a microprocessor manufactured by Motorola, such as the 680X0 processor, or a microprocessor manufactured by Intel, such as the 80X86 or Pentium processor, However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images. Alternatively, the video memory could be used to drive a flat panel or liquid crystal display (LCD), or any other suitable data presentation device.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. The communication interface 120 could also be a cable modem or wireless interface. In any such implementation, the communication interface 120 sends and receives electrical, electromagnetic or optical signals which carry digital data streams representing various types of information.

Network link 121 typically provides data communication through one or more networks to other data devices. For example, network link 121 may provide a connection through local network 122 to local server computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, remote server computer 126 might transmit a requested code for an application program through Internet 125, ISP 124, local network 122 and communication interface 120.

The received code may be executed by processor 113 as it is received, and/or stored in mass storage 112, or other non-volatile storage for later execution. In this manner, computer 100 may obtain application code in the form of a carrier wave.

Application code may be embodied in any form of computer program product. A computer program product comprises a medium configured to store or transport computer readable code or data, or in which computer readable code or data may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment, including embedded devices (e.g., web phones, etc.) and "thin" client processing environments (e.g., network computers (NC's), etc.) that support a virtual machine.

Figure 18:
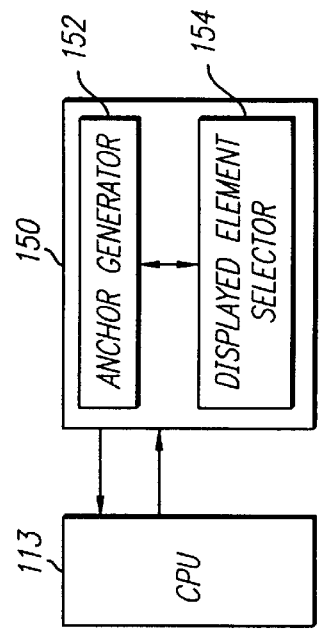
FIG. 18 is a block diagram of illustrating a navigator associated with a computer in accordance with an embodiment of the invention.

In one or more embodiments, a navigator 150 may be associated with a computer such as computer 100 described above for implementing the above-described method. As illustrated in FIG. 18, the navigator 150 communicates with the CPU 113 of the computer 100. The navigator 150 includes an anchor generator 152 and a displayed element selector 154. The anchor generator 152 initiates and adjusts the anchor 152. The displayed element selector 154 selects the displayed elements based on the anchor, currently selected displayed element and user input. In this arrangement, a user input is communicated to the displayed element selector 154 by the CPU 113. The displayed element selector 154 selects the displayed element, as in accordance with step S4 of the method above, and communicates this selection to the CPU 113 (whereupon the CPU 113 may make the displayed element which was selected visible, such as by highlighting on the screen 117). Once the displayed element is selected, the anchor generator generates or adjusts the anchor 152, as in accordance with step S5 of the method above.

As will be appreciated by those of skill in the art, there are a wide variety of configuration for hardware and software for accomplishing the method of the invention other than that described above.

Of course, the foregoing description is that of preferred embodiments of the invention, and various changes and modifications may be made without departing from the spirit and scope of the invention, as defined by the claims.

What is claimed is:

1. A method of navigating one or more displayed elements, comprising:

generating a first list comprising one or more displayed elements;

generating a reference anchor, wherein said reference anchor comprises coordinates of a geometric shape;

accepting user-entered navigation input; and determining a displayed element to be selected from said first list of said one or more displayed elements based upon the position of said one or more displayed elements to said reference anchor and the direction of said user-entered navigation input, wherein said direction of said user-entered navigation input is in the horizontal direction;

adjusting said reference anchor depending on the existence of overlapping condition, said overlapping condition existing when said one or more displayed elements fall within a projection of said reference anchor in said horizontal direction, said adjusting said reference anchor comprising:

adjusting said reference anchor to the geometry of said selected displayed element when no overlapping condition exist;

adjusting said reference anchor when overlapping condition exist comprising:

changing the right and left values of said reference anchor to that of said selected displayed element;

adjusting top value of said reference anchor to the lowest of said selected displayed element top value and said reference anchor top value; and adjusting bottom value of said reference anchor to the largest of said selected displayed element bottom value and said reference anchor bottom value.

2. The method of claim 1, wherein said first list comprises a listing of said one or more displayed elements in top-down order in accordance with the position of the top-left corners of said displayed elements.

3. A method of navigating one or more displayed elements, comprising:

generating a first list comprising one or more displayed elements;

generating a reference anchor, wherein said reference anchor comprises coordinates of a geometric shape;

accepting user-entered navigation input; and determining a displayed element to be selected from said first list of said one or more displayed elements based upon the position of said one or more displayed elements to said reference anchor and the direction of said user-entered navigation input, wherein said direction of said user-entered navigation input is in the vertical direction;

adjusting said reference anchor depending on the existence of overlapping condition, said overlapping condition existing when said one or more displayed elements fall within a projection of said reference anchor in said vertical direction, said adjusting said reference anchor comprising:

adjusting said reference anchor to the geometry of said selected displayed element when no overlapping condition exist;

adjusting said reference anchor when overlapping condition exist comprising:

changing the top and bottom values of said reference anchor to that of said selected displayed element;

adjusting left value of said reference anchor to the largest of said selected displayed element left value and said reference anchor left value; and adjusting right value of said reference anchor to the lowest of said selected displayed element right value and said reference anchor right value.

4. The method of claim 3, wherein said first list comprises a listing of said one or more displayed elements in top-down order in accordance with the position of the top-left corners of said displayed elements.

5. A method of navigating one or more displayed elements, comprising:
generating a first list comprising one or more displayed elements;
generating a reference anchor, wherein said reference anchor comprises coordinates of a geometric shape;
accepting user-entered navigation input; and
determining a displayed element to be selected from said first list of said one or more displayed elements based upon the position of said one or more displayed elements to said reference anchor and the direction of said user-entered navigation input, wherein said direction of said user-entered navigation input is horizontally left of said reference anchor;
adjusting said reference anchor depending on the existence of overlapping condition, said overlapping condition existing when said one or more displayed elements fall within a projection of said reference anchor in the direction of said input, said determining a displayed element to be selected comprising:
selecting a displayed element from said first list which is vertically above and closest to said reference anchor when no overlapping condition exist;
selecting a displayed element when overlapping condition exist comprising:
ordering overlapping displayed elements from said first list into a second list in order of closeness of bottom of said overlapping displayed elements to bottom of said reference anchor;
selecting a displayed element from said second list that is horizontally closest to said reference anchor.

6. The method of claim 5, wherein said first list comprises a listing of said one or more displayed elements in top-down order in accordance with the position of the top-left corners of said displayed elements.

7. A method of navigating one or more displayed elements, comprising:
generating a first list comprising one or more displayed elements;
generating a reference anchor, wherein said reference anchor comprises coordinates of a geometric shape;
accepting user-entered navigation input; and
determining a displayed element to be selected from said first list of said one or more displayed elements based upon the position of said one or more displayed elements to said reference anchor and the direction of said user-entered navigation input, wherein said direction of said user-entered navigation input is horizontally right of said reference anchor;
adjusting said reference anchor depending on the existence of overlapping condition, said overlapping condition existing when said one or more displayed elements fall within a projection of said reference anchor in the direction of said input, said determining a displayed element to be selected comprising:
selecting a displayed element from said first list which is vertically below and closest to said reference anchor when no overlapping condition exist;
selecting a displayed element when overlapping condition exist comprising:
ordering overlapping displayed elements from said first list into a second list in order of closeness of top of said overlapping displayed elements to top of said reference anchor;
selecting a displayed element from said second list that is horizontally closest to said reference anchor.

8. The method of claim 7, wherein said first list comprises a listing of said one or more displayed elements in top-down order in accordance with the position of the top-left corners of said displayed elements.

9. A method of navigating one or more displayed elements, comprising:
generating a first list comprising one or more displayed elements;
generating a reference anchor, wherein said reference anchor comprises coordinates of a geometric shape;
accepting user-entered navigation input; and
determining a displayed element to be selected from said first list of said one or more displayed elements based upon the position of said one or more displayed elements to said reference anchor and the direction of said user-entered navigation input, wherein said direction of said user-entered navigation input is vertically up of said reference anchor;
adjusting said reference anchor depending on the existence of overlapping condition, said overlapping condition existing when said one or more displayed elements fall within a projection of said reference anchor in the direction of said input, said determining a displayed element to be selected comprising:
selecting a displayed element from said first list which is both vertically and horizontally closest to said reference anchor when no overlapping condition exist;
selecting a displayed element when overlapping condition exist comprising:
ordering overlapping displayed elements from said first list into a second list;
selecting a displayed element from said second list that is vertically closest to said reference anchor.

10. The method of claim 9, wherein said first list comprises a listing of said one or more displayed elements in top-down order in accordance with the position of the top-left corners of said displayed elements.

11. A method of navigating one or more displayed elements, comprising:
generating a first list comprising one or more displayed elements;
generating a reference anchor, wherein said reference anchor comprises coordinates of a geometric shape;
accepting user-entered navigation input; and
determining a displayed element to be selected from said first list of said one or more displayed elements based upon the position of said one or more displayed elements to said reference anchor and the direction of said user-entered navigation input, wherein said direction of said user-entered navigation input is vertically down of said reference anchor;
adjusting said reference anchor depending on the existence of overlapping condition, said overlapping condition existing when said one or more displayed elements fall within a projection of said reference anchor in the direction of said input, said determining a displayed element to be selected comprising:
selecting a displayed element from said first list which is both vertically and horizontally closest to said reference anchor when no overlapping condition exist;
selecting a displayed element when overlapping condition exist comprising:
ordering overlapping displayed elements from said first list into a second list;
selecting a displayed element from said second list that is vertically closest to said reference anchor.

12. The method of claim 11, wherein said first list comprises a listing of said one or more displayed elements in top-down order in accordance with the position of the top-left corners of said displayed elements.

13. A computer program product comprising:
   a computer usable medium having computer readable program code embodied therein for navigating one or more displayed elements comprising:
   computer readable program code configured to cause a computer to generate a first list comprising one or more displayed elements;
   computer readable program code configured to cause a computer to generate a reference anchor, wherein said reference anchor comprises coordinates of a geometric shape;
   computer readable program code configured to cause a computer to accept a user-entered navigation input; and
   computer readable program code configured to cause a computer to determine a displayed element to be selected from said first list of said one or more displayed elements based upon the position of said displayed elements to said reference anchor and the direction of said user-entered navigation input, wherein said direction of said user-entered navigation input is in the horizontal direction;
   computer readable program code configured to cause a computer to adjust said reference anchor depending upon the existence of overlapping condition, said overlapping condition existing when said one or more displayed elements fall within a projection of said reference anchor in said horizontal direction, said adjusting said reference anchor comprising:
   adjusting said reference anchor to the geometry of said selected displayed element when no overlapping condition exist;
   adjusting said reference anchor when overlapping condition exist comprising:
      changing the right and left values of said reference anchor to that of said selected displayed element;
      adjusting top value of said reference anchor to the lowest of said selected displayed element top value and said reference anchor top value; and
      adjusting bottom value of said reference anchor to the largest of said selected displayed element bottom value and said reference anchor bottom value.

14. The computer program product of claim 13, wherein said first list comprises a listing of said one or more displayed elements in top-down order in accordance with the position of the top-left corners of said displayed elements.

15. A computer program product comprising:
   a computer usable medium having computer readable program code embodied therein for navigating one or more displayed elements comprising:
   computer readable program code configured to cause a computer to generate a first list comprising one or more displayed elements;
   computer readable program code configured to cause a computer to generate a reference anchor, wherein said reference anchor comprises coordinates of a geometric shape;
   computer readable program code configured to cause a computer to accept a user-entered navigation input; and
   computer readable program code configured to cause a computer to determine a displayed element to be selected from said first list of said one or more displayed elements based upon the position of said displayed elements to said reference anchor and the direction of said user-entered navigation input, wherein said direction of said user-entered navigation input is in the vertical direction;
   computer readable program code configured to cause a computer to adjust said reference anchor depending upon the existence of overlapping condition, said overlapping condition existing when said one or more displayed elements fall within a projection of said reference anchor in said vertical direction, said adjusting said reference anchor comprising:
   adjusting said reference anchor to the geometry of said selected displayed element when no overlapping condition exist;
   adjusting said reference anchor when overlapping condition exist comprising:
      changing the top and bottom values of said reference anchor to that of said selected displayed element;
      adjusting left value of said reference anchor to the largest of said selected displayed element left value and said reference anchor left value; and
      adjusting right value of said reference anchor to the lowest of said selected displayed element right value and said reference anchor right value.

16. The computer program product of claim 15, wherein said first list comprises a listing of said one or more displayed elements in top-down order in accordance with the position of the top-left corners of said displayed elements.

17. A computer program product comprising:
   a computer usable medium having computer readable program code embodied therein for navigating one or more displayed elements comprising:
   computer readable program code configured to cause a computer to generate a first list comprising one or more displayed elements;
   computer readable program code configured to cause a computer to generate a reference anchor, wherein said reference anchor comprises coordinates of a geometric shape;
   computer readable program code configured to cause a computer to accept a user-entered navigation input; and
   computer readable program code configured to cause a computer to determine a displayed element to be selected from said first list of said one or more displayed elements based upon the position of said displayed elements to said reference anchor and the direction of said user-entered navigation input, wherein said direction of said user-entered navigation input is horizontally left of said reference anchor;
   computer readable program code configured to cause a computer to adjust said reference anchor depending upon the existence of overlapping condition, said overlapping condition existing when said one or more displayed elements fall within a projection of said reference anchor in the direction of said input, said determining a displayed element to be selected comprising:
   selecting a displayed element from said first list which is vertically above and closest to said reference anchor when no overlapping condition exist;
   selecting a displayed element when overlapping condition exist comprising:
      ordering overlapping displayed elements from said first list into a second list in order of closeness of bottom of said overlapping displayed elements to bottom of said reference anchor;

selecting a displayed element from said second list that is horizontally closest to said reference anchor.

18. The computer program product of claim 17, wherein said first list comprises a listing of said one or more displayed elements in top-down order in accordance with the position of the top-left corners of said displayed elements.

19. A computer program product comprising:

a computer usable medium having computer readable program code embodied therein for navigating one or more displayed elements comprising:

computer readable program code configured to cause a computer to generate a first list comprising one or more displayed elements;

computer readable program code configured to cause a computer to generate a reference anchor, wherein said reference anchor comprises coordinates of a geometric shape;

computer readable program code configured to cause a computer to accept a user-entered navigation input; and computer readable program code configured to cause a computer to determine a displayed element to be selected from said first list of said one or more displayed elements based upon the position of said displayed elements to said reference anchor and the direction of said user-entered navigation input, wherein said direction of said user-entered navigation input is horizontally right of said reference anchor;

computer readable program code configured to cause a computer to adjust said reference anchor depending upon the existence of overlapping condition, said overlapping condition existing when said one or more displayed elements fall within a projection of said reference anchor in the direction of said input, said determining a displayed element to be selected comprising:

selecting a displayed element from said first list which is vertically below and closest to said reference anchor when no overlapping condition exist;

selecting a displayed element when overlapping condition exist comprising:

ordering overlapping displayed elements from said first list into a second list in order of closeness of top of said overlapping displayed elements to top of said reference anchor;

selecting a displayed element from said second list that is horizontally closest to said reference anchor.

20. The computer program product of claim 19, wherein said first list comprises a listing of said one or more displayed elements in top-down order in accordance with the position of the top-left corners of said displayed elements.

21. A computer program product comprising:

a computer usable medium having computer readable program code embodied therein for navigating one or more displayed elements comprising:

computer readable program code configured to cause a computer to generate a first list comprising one or more displayed elements;

computer readable program code configured to cause a computer to generate a reference anchor, wherein said reference anchor comprises coordinates of a geometric shape;

computer readable program code configured to cause a computer to accept a user-entered navigation input; and computer readable program code configured to cause a computer to determine a displayed element to be selected from said first list of said one or more displayed elements based upon the position of said displayed elements to said reference anchor and the direction of said user-entered navigation input, wherein said direction of said user-entered navigation input is vertically up of said reference anchor;

computer readable program code configured to cause a computer to adjust said reference anchor depending upon the existence of overlapping condition, said overlapping condition existing when said one or more displayed elements fall within a projection of said reference anchor in the direction of said input, said determining a displayed element to be selected comprising:

selecting a displayed element from said first list which is both vertically and horizontally closest to said reference anchor when no overlapping condition exist;

selecting a displayed element when overlapping condition exist comprising:

ordering overlapping displayed elements from said first list into a second list;

selecting a displayed element from said second list that is vertically closest to said reference anchor.

22. The computer program product of claim 21, wherein said first list comprises a listing of said one or more displayed elements in top-down order in accordance with the position of the top-left corners of said displayed elements.

23. A computer program product comprising:

a computer usable medium having computer readable program code embodied therein for navigating one or more displayed elements comprising:

computer readable program code configured to cause a computer to generate a first list comprising one or more displayed elements;

computer readable program code configured to cause a computer to generate a reference anchor, wherein said reference anchor comprises coordinates of a geometric shape;

computer readable program code configured to cause a computer to accept a user-entered navigation input; and computer readable program code configured to cause a computer to determine a displayed element to be selected from said first list of said one or more displayed elements based upon the position of said displayed elements to said reference anchor and the direction of said user-entered navigation input, wherein said direction of said user-entered navigation input is vertically down of said reference anchor;

computer readable program code configured to cause a computer to adjust said reference anchor depending upon the existence of overlapping condition, said overlapping condition existing when said one or more displayed elements fall within a projection of said reference anchor in the direction of said input, said determining a displayed element to be selected comprising:

selecting a displayed element from said first list which is both vertically and horizontally closest to said reference anchor when no overlapping condition exist;

selecting a displayed element when overlapping condition exist comprising:

ordering overlapping displayed elements from said first list into a second list;

selecting a displayed element from said second list that is vertically closest to said reference anchor.

24. The computer program product of claim 23, wherein said first list comprises a listing of said one or more displayed elements in top-down order in accordance with the position of the top-left corners of said displayed elements.

25. A computer system comprising:
a processor; a display screen; a navigation system for navigating one or more displayed elements on said display screen generated by said processor, said navigation system comprising:
an anchor generator for generating a reference anchor, wherein said reference anchor comprises coordinates of a geometric shape;
a list generator for generating a first list of said one or more displayed elements; and
a displayed element selector for selecting a displayed element from said first list based on the direction of a user-entered navigation input and the position of said reference anchor, wherein said direction of said user-entered navigation input is in the horizontal direction, adjusting said reference anchor based upon said selected displayed element, said adjusting said reference anchor depending on the existence of overlapping condition, said overlapping condition existing when said one or more displayed elements fall within a projection of said reference anchor in said horizontal direction, said adjusting said reference anchor comprising:
adjusting said reference anchor to the geometry of said selected displayed element when no overlapping condition exist;
adjusting said reference anchor when overlapping condition exist comprising:
changing the right and left values of said reference anchor to that of said selected displayed element;
adjusting top value of said reference anchor to the lowest of said selected displayed element top value and said reference anchor top value; and
adjusting bottom value of said reference anchor to the largest of said selected displayed element bottom value and said reference anchor bottom value.

26. The system of claim 25, wherein said first list comprises a listing of said one or more displayed elements in top-down order in accordance with the position of the top-left corners of said displayed elements.

27. A computer system comprising:
a processor; a display screen; a navigation system for navigating one or more displayed elements on said display screen generated by said processor, said navigation system comprising:
an anchor generator for generating a reference anchor, wherein said reference anchor comprises coordinates of a geometric shape;
a list generator for generating a first list of said one or more displayed elements; and
a displayed element selector for selecting a displayed element from said first list based on the direction of a user-entered navigation input and the position of said reference anchor, wherein said direction of said user-entered navigation input is in the vertical direction, adjusting said reference anchor based upon said selected displayed element, said adjusting said reference anchor depending on the existence of overlapping condition, said overlapping condition existing when said one or more displayed elements fall within a projection of said reference anchor in said vertical direction, said adjusting said reference anchor comprising:
adjusting said reference anchor to the geometry of said selected displayed element when no overlapping condition exist;
adjusting said reference anchor when overlapping condition exist comprising:
changing the top and bottom values of said reference anchor to that of said selected displayed element;
adjusting left value of said reference anchor to the largest of said selected displayed element left value and said reference anchor left value; and
adjusting right value of said reference anchor to the lowest of said selected displayed element right value and said reference anchor right value.

28. The system of claim 27, wherein said first list comprises a listing of said one or more displayed elements in top-down order in accordance with the position of the top-left corners of said displayed elements.

29. A computer system comprising:
a processor; a display screen; a navigation system for navigating one or more displayed elements on said display screen generated by said processor, said navigation system comprising:
an anchor generator for generating a reference anchor, wherein said reference anchor comprises coordinates of a geometric shape;
a list generator for generating a first list of said one or more displayed elements; and
a displayed element selector for selecting a displayed element from said first list based on the direction of a user-entered navigation input and the position of said reference anchor, wherein said direction of said user-entered navigation input is horizontally left of said reference anchor, adjusting said reference anchor based upon said selected displayed element, said adjusting said reference anchor depending on the existence of overlapping condition, said overlapping condition existing when said one or more displayed elements fall within a projection of said reference anchor in the direction of said input, said determining a displayed element to be selected comprising:
selecting a displayed element from said first list which is vertically above and closest to said reference anchor when no overlapping condition exist;
selecting a displayed element when overlapping condition exist comprising:
ordering overlapping displayed elements from said first list into a second list in order of closeness of bottom of said overlapping displayed elements to bottom of said reference anchor;
selecting a displayed element from said second list that is horizontally closest to said reference anchor.

30. The system of claim 29, wherein said first list comprises a listing of said one or more displayed elements in top-down order in accordance with the position of the top-left corners of said displayed elements.

31. A computer system comprising:
a processor; a display screen; a navigation system for navigating one or more displayed elements on said display screen generated by said processor, said navigation system comprising:
an anchor generator for generating a reference anchor, wherein said reference anchor comprises coordinates of a geometric shape;

a list generator for generating a first list of said one or more displayed elements; and a displayed element selector for selecting a displayed element from said first list based on the direction of a user-entered navigation input and the position of said reference anchor, wherein said direction of said user-entered navigation input is horizontally right of said reference anchor, adjusting said reference anchor based upon said selected displayed element, said adjusting said reference anchor depending on the existence of overlapping condition, said overlapping condition existing when said one or more displayed elements fall within a projection of said reference anchor in the direction of said input, said determining a displayed element to be selected comprising:

selecting a displayed element from said first list which is vertically below and closest to said reference anchor when no overlapping condition exist;

selecting a displayed element when overlapping condition exist comprising:
ordering overlapping displayed elements from said first list into a second list in order of closeness of top of said overlapping displayed elements to top of said reference anchor;
selecting a displayed element from said second list that is horizontally closest to said reference anchor.

32. The system of claim 31, wherein said first list comprises a listing of said one or more displayed elements in top-down order in accordance with the position of the top-left corners of said displayed elements.

33. A computer system comprising:

a processor; a display screen; a navigation system for navigating one or more displayed elements on said display screen generated by said processor, said navigation system comprising:

an anchor generator for generating a reference anchor, wherein said reference anchor comprises coordinates of a geometric shape;

a list generator for generating a first list of said one or more displayed elements; and a displayed element selector for selecting a displayed element from said first list based on the direction of a user-entered navigation input and the position of said reference anchor, wherein said direction of said user-entered navigation input is vertically up of said reference anchor, adjusting said reference anchor based upon said selected displayed element, said adjusting said reference anchor depending on the existence of overlapping condition, said overlapping condition existing when said one or more displayed elements fall within a projection of said reference anchor in the direction of said input, said determining a displayed element to be selected comprising:

selecting a displayed element from said first list which is both vertically and horizontally closest to said reference anchor when no overlapping condition exist;

selecting a displayed element when overlapping condition exist comprising:
ordering overlapping displayed elements from said first list into a second list;
selecting a displayed element from said second list that is vertically closest to said reference anchor.

34. The system of claim 33, wherein said first list comprises a listing of said one or more displayed elements in top-down order in accordance with the position of the top-left corners of said displayed elements.

35. A computer system comprising:

a processor; a display screen; a navigation system for navigating one or more displayed elements on said display screen generated by said processor, said navigation system comprising:

an anchor generator for generating a reference anchor, wherein said reference anchor comprises coordinates of a geometric shape;

a list generator for generating a first list of said one or more displayed elements; and a displayed element selector for selecting a displayed element from said first list based on the direction of a user-entered navigation input and the position of said reference anchor, wherein said direction of said user-entered navigation input is vertically down of said reference anchor, adjusting said reference anchor based upon said selected displayed element, said adjusting said reference anchor depending on the existence of overlapping condition, said overlapping condition existing when said one or more displayed elements fall within a projection of said reference anchor in the direction of said input, said determining a displayed element to be selected comprising:

selecting a displayed element from said first list which is both vertically and horizontally closest to said reference anchor when no overlapping condition exist;

selecting a displayed element when overlapping condition exist comprising:
ordering overlapping displayed elements from said first list into a second list;
selecting a displayed element from said second list that is vertically closest to said reference anchor.

36. The system of claim 35, wherein said first list comprises a listing of said one or more displayed elements in top-down order in accordance with the position of the top-left corners of said displayed elements.

* * * * *

UNITED STATES PATENT AND TRADEMARK OFFICE
CERTIFICATE OF CORRECTION

PATENT NO. : 6,317,144 B1
DATED : November 13, 2001
INVENTOR(S) : Pabla et al.

It is certified that error appears in the above-identified patent and that said Letters Patent is hereby corrected as shown below:

<u>Title page,</u>
Item [74], please change "*Attorney, Agent, or Firm* - The Becker Law Group" to
-- *Attorney, Agent or Firm* - The Hecker Law Group --.

Signed and Sealed this

Ninth Day of April, 2002

Attest:

*Attesting Officer*

JAMES E. ROGAN
*Director of the United States Patent and Trademark Office*